(12) United States Patent
Xu et al.

(10) Patent No.: US 11,277,737 B2
(45) Date of Patent: Mar. 15, 2022

(54) CONTROL RESOURCE SET FOR UES HAVING DIFFERENT BANDWIDTH CAPABILITIES

(71) Applicant: QUALCOMM Incorporated, San Diego, CA (US)

(72) Inventors: Huilin Xu, San Diego, CA (US); Renqiu Wang, San Diego, CA (US); Peter Pui Lok Ang, San Diego, CA (US); Tingfang Ji, San Diego, CA (US); Wanshi Chen, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/717,021

(22) Filed: Dec. 17, 2019

(65) Prior Publication Data
US 2020/0228966 A1 Jul. 16, 2020

Related U.S. Application Data

(60) Provisional application No. 62/793,339, filed on Jan. 16, 2019.

(51) Int. Cl.
*H04L 12/28* (2006.01)
*H04W 8/24* (2009.01)
(Continued)

(52) U.S. Cl.
CPC ............. *H04W 8/24* (2013.01); *H04W 24/08* (2013.01); *H04W 56/001* (2013.01); *H04W 72/042* (2013.01); *H04W 72/0453* (2013.01)

(58) Field of Classification Search
CPC ............... H04W 72/04; H04W 72/042; H04W 72/0453; H04W 48/12; H04W 56/001; H04L 41/0896
(Continued)

(56) References Cited

U.S. PATENT DOCUMENTS

| 2019/0158326 A1* | 5/2019 | Liao | H04L 5/0048 |
| 2019/0215807 A1* | 7/2019 | Hwang | H04L 27/2602 |
| 2020/0029316 A1* | 1/2020 | Zhou | H04W 74/0833 |

FOREIGN PATENT DOCUMENTS

WO 2018128468 A1 7/2018

OTHER PUBLICATIONS

Huawei et al., "Configuration of Control Resource Set", 3GPP Draft, 3GPP TSG RAN WG1 Meeting #90, R1-1712182, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017 Aug. 20, 2017 (Aug. 20, 2017), XP051314999, 5 Pages, Retrieved from the Internet: URL:http://www.3gpp.org/ftp/Meetings_3GPP-_SYNC/RAN1/Docs/ [retrieved on Aug. 20, 2017].

(Continued)

*Primary Examiner* — John Pezzlo
(74) *Attorney, Agent, or Firm* — Qualcomm Incorporated

(57) ABSTRACT

Control channel decoding can consume a significant amount of power with respect to the device's total power battery lifetime, as well as being a factor in the complexity of device. Aspects of a method, apparatus, and computer-readable medium are presented herein that provide a solution to the problem of control channel decoding complexity and power requirements by improving the manner in which control channels are decoded. An apparatus configures an initial CORESET having a reduced bandwidth corresponding to a bandwidth capability of a first UE type. The reduced bandwidth having a narrower frequency range than a bandwidth capability of a second UE type. The apparatus may configure a first CORESET for a first UE having a first bandwidth capability and a second CORESET for a second (Continued)

UE having a second bandwidth capability. The apparatus transmits control channel(s) in the configured CORESET(s).

24 Claims, 17 Drawing Sheets

(51) Int. Cl.
  *H04W 72/04* (2009.01)
  *H04W 56/00* (2009.01)
  *H04W 24/08* (2009.01)
  *H04J 1/16* (2006.01)
(58) Field of Classification Search
  USPC .................................... 370/252, 329, 430
  See application file for complete search history.

(56) References Cited

OTHER PUBLICATIONS

International Search Report and Written Opinion—PCT/US2019/067159—ISA/EPO—dated Mar. 16, 2020.
Qualcomm Incorporated: "Remaining Issues on Control Resource Set and Search Space", 3GPP Draft, 3GPP TSG RAN WG1 Meeting #93, R1-1807353_Remaining Issues on Control Resource Set and Search Space, 3rd Generation Partnership Project (3GPP), Mobile Competence Centre, vol. RAN WG1, No. Susan, Korea, May 21, 2018-May 25, 2018 May 20, 2018 (May 20, 2018), XP051442545, 11 Pages, Retrieved from the Internet: URL:http://www.3gpp.org/ftp/Meetings%5F3GPP%5FSYNC/RAN1/Docs/ [retrieved on May 20, 2018].

* cited by examiner

CONTROL RESOURCE SET FOR UES HAVING DIFFERENT BANDWIDTH CAPABILITIES

CROSS REFERENCE TO RELATED APPLICATION(S)

This application claims the benefit of U.S. Provisional Application Ser. No. 62/793,339, entitled "Control Resource Set for UEs Having Different Bandwidth Capabilities" and filed on Jan. 16, 2019, which is expressly incorporated by reference herein in its entirety.

BACKGROUND

Technical Field

The present disclosure relates generally to communication systems, and more particularly, to a wireless communication including a control resource set.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Mobile devices may support different spectrum bands that were not used for previous mobile communications. The complexity of these mobile devices may vary, as different devices may have different bandwidth capabilities. Different types of devices may have different goals for throughput, processing capability, and power computations. One type of User Equipment (UE) may target high throughput and processing capability, whereas other devices may target reduced hardware costs and lower power consumption. Control channel decoding can be a factor in device complexity, thus, reducing the complexity of control channel design can be beneficial to reduce device complexity and power use. Aspects presented herein provide a solution to the problem of control channel decoding by improving the manner in which a base station configures a Control Resource Set (CORESET) for multiple UE types. The different types of UEs may correspond to different bandwidth capabilities. In some aspects, control channel configuration may be optimized to allow for multiple UE types across different bandwidth capabilities to monitor for and decode control channel(s). Configuring control channel configurations that can be decoded by multiple UE types, as presented herein, may allow for UEs having a lower design complexity.

In an aspect of the disclosure, a method, a computer-readable medium, and an apparatus are provided for wireless communication at a base station. The apparatus configures an initial Control Resource Set (CORESET) having a reduced bandwidth corresponding to a bandwidth capability of a first User Equipment (UE) type. In some aspects, the reduced bandwidth may have a narrower frequency range than a bandwidth capability of a second UE type. The apparatus transmits a control channel in the initial CORESET.

In another aspect of the disclosure, a method, a computer-readable medium, and an apparatus are provided for wireless communication at a base station. The apparatus configures a first initial CORESET for a first UE type having a first bandwidth capability. The apparatus configures a second initial CORESET for at least a second UE type having a second bandwidth capability that is lower than the first bandwidth capability. The apparatus transmits a control channel in at least one of the first initial CORESET or the second initial CORESET.

In another aspect of the disclosure, a method, a computer-readable medium, and an apparatus are provided for wireless communication at a UE of a first UE type. The apparatus determines a configuration of an initial CORESET having a reduced bandwidth corresponding to a bandwidth capability of the first UE type. In some aspects, the reduced bandwidth may have a narrower frequency range than a bandwidth capability of a second UE type. The apparatus monitors for a control channel from a base station in the initial CORESET.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
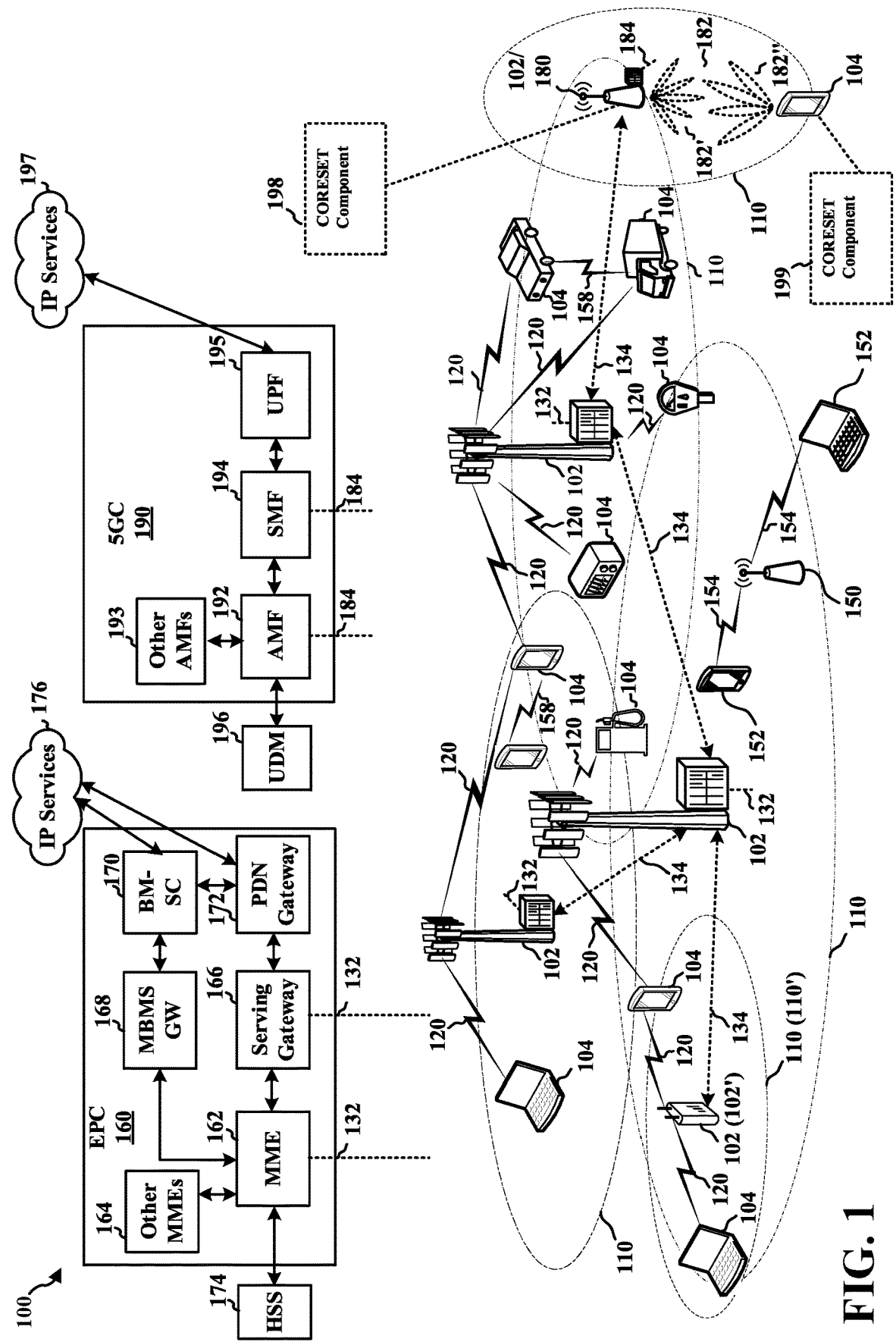
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as Internet of Things (IoT) devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a CORESET component 198 that configures an initial CORESET having a reduced bandwidth corresponding to a bandwidth capability of a first UE type. The base station 180 may transmit a control channel in the initial CORESET. In some aspects, the CORESET component 198 may configure a first initial CORESET for a first UE type having a first bandwidth capability. The CORESET component 198 may also configure a second initial CORESET for a second UE type having a second bandwidth capability. The base station may transmit a control channel in at least one of the first or second initial CORESETs. UE 104 may comprise a CORESET component 199 configured to determine a configuration of an initial CORESET having a reduced bandwidth corresponding to a bandwidth capability of the first UE type. The UE 104 can then monitor for a control channel from a base station (e.g., base station 180) in the initial CORESET.

Figure 2A:
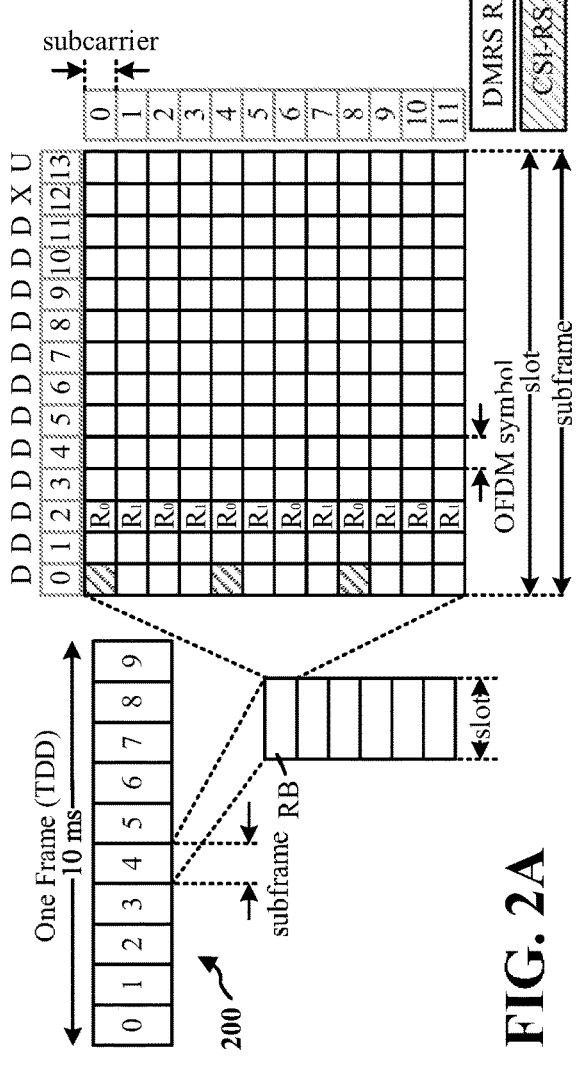
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
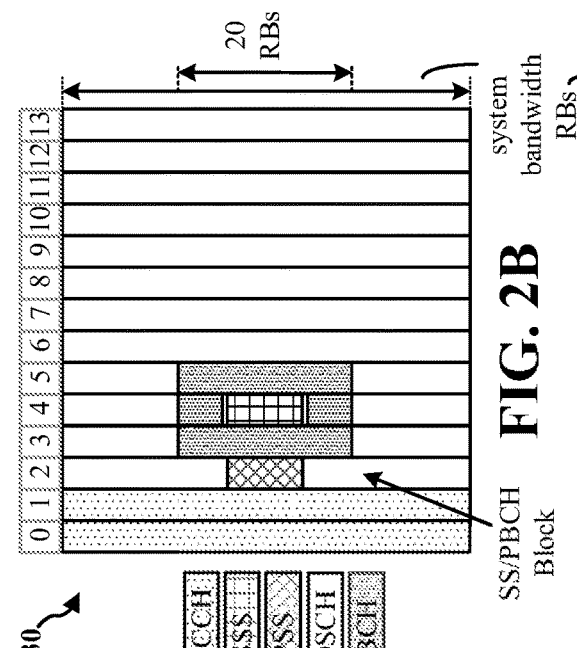
Figure 2C:
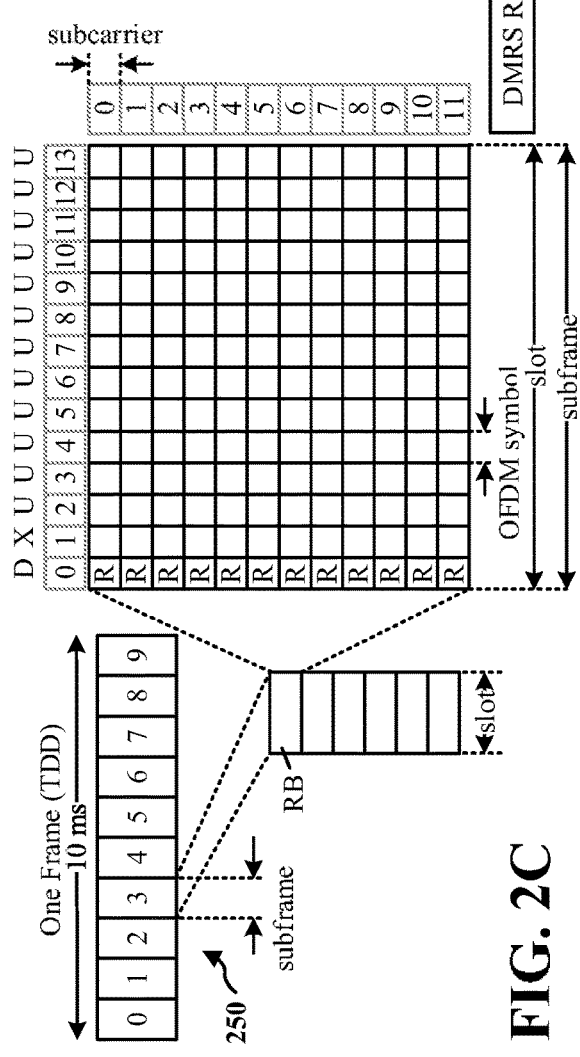
Figure 2D:
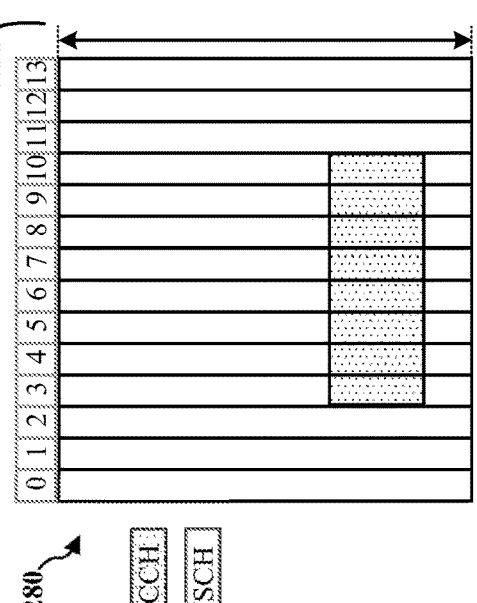

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
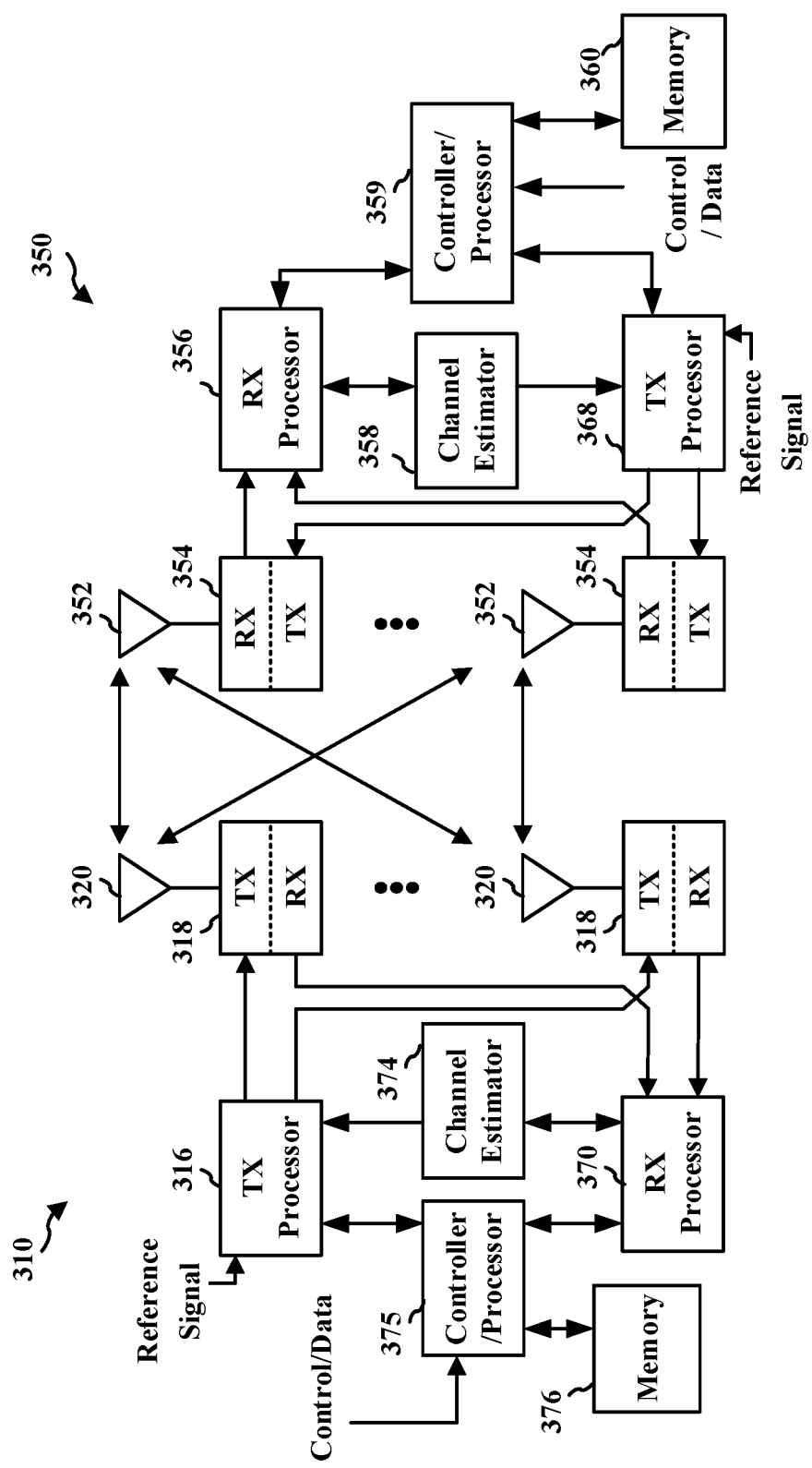
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Mobile devices that support 5G NR may be configured to use higher spectrum bands that were not available to be used for wireless communications under previous wireless communications standards. Communication may be targeted at premium UEs for increased throughput, increased processing capability, and high power computation which may result in increased hardware costs and reduced battery life. However, other devices, e.g., lower tier UEs, may be suitable for applications that may not require the increased throughput, increased processing capability, and high power computation of premium UEs. These other devices may be referred to as "NR Light" devices, where the lower tier UEs may include low-tier devices and/or mid-tier devices. For example, NR Light devices may be suitable for low end UEs, wearable devices, sensors, and the like. Some example use cases for NR Light devices (e.g., low-tier and/or mid-tier devices) include smart wearable devices (e.g., watch), video surveillance, or Industrial IoT (IIoT) devices.

In comparison with premium UEs, NR Light UEs including low tier UEs may have a lower design complexity that reduces hardware costs and power consumption. However, decoding control channels (e.g., PDCCH) may be a factor that influences the complexity of the design of the UEs, as well as power consumption. For example, PDCCH may be decoded using blind detection in each slot. Thus, monitoring for a control channel may account for a significant amount of the UE's power consumption. There exists a need to further improve control channel configurations to be suitable for such less complex UEs, such that UE types having different bandwidth capabilities can receive and decode control channels. Optimizing the control channel configurations may reduce the complexity of the control channel configuration for UEs (e.g., low tier UEs) with a reduced or lower design complexity in comparison to premium UEs. Optimizing the control channel configurations may be accomplished by modifying the manner in which base stations configure a CORESET, such that a CORESET may be designed to be compatible with lower tier UEs.

Figure 4:
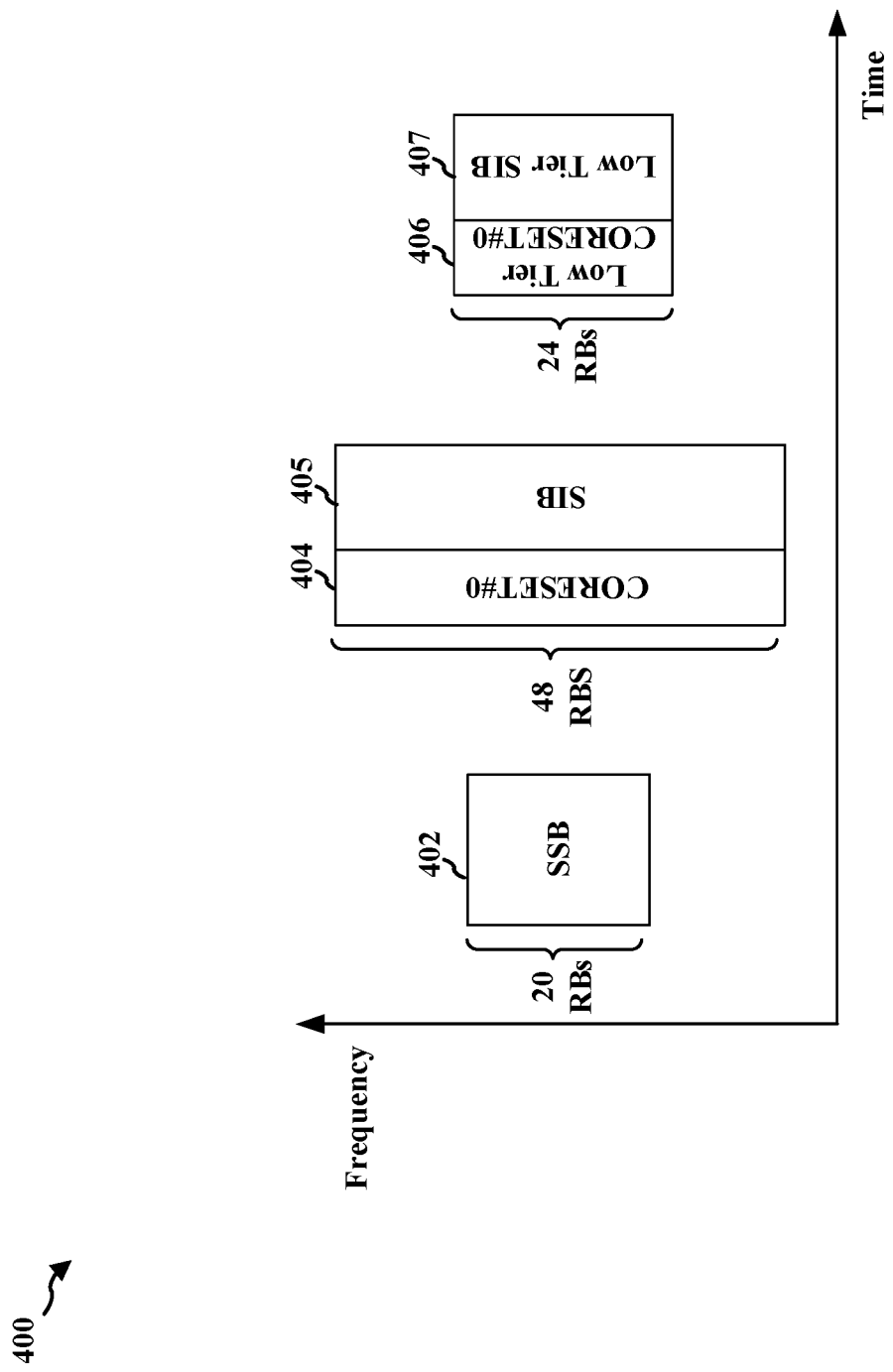
FIG. 4 is a diagram illustrating an example of a time resource configuration in accordance with certain aspects of the disclosure.

A CORESET defines frequency domain resource blocks (RBs) and a time domain duration, e.g., number of consecutive symbols, that constitute a control region where the PDCCH is transmitted by the base station and decoded by the UE. FIG. 4 illustrates an example CORESET 404 as a set of 48 RBs over a duration of time. A search space set (SS set) associated with the CORESET defines the time domain periodicity, e.g., in unit of slots, slot within the periodicity and symbol locations of the control region in the slot. A control region is called a SS set occasion. More than one control region can be configured in a slot. 5G NR, for example, can support up to 3 CORESETs and 10 SS sets in an active bandwidth part (BWP) configured for the UE (e.g., a premium UE). However, some UEs (e.g., lower tier UEs) may be configured to support less than 3 CORESETs. A special CORESET, known as CORESET #0 with ID=0, may be initially configured in the master information block (MIB). The CORESET #0 is the first CORESET that is monitored by the UE for the initial PDCCH decoding and may be referred to herein as an "initial CORESET." The bandwidth of CORESET #0 may be equal to the bandwidth of the initial BWP.

In some aspects, low tier UEs may support a maximum bandwidth of only 5 MHz, 10 MHz, or 20 MHz, etc. However, CORESET #0, e.g. for NR, may be configured with 24 RBs, 48 RBs, or 96 RBs. Table 1 illustrates the bandwidth supported for each subcarrier spacing (SCS) for 24, 48, or 96 RBs.

TABLE 1

| Subcarrier spacing (kHz) | Supported # of RBs | Bandwidth (MHz) |
| --- | --- | --- |
| 15 | 24, 48, 96 | 4.32, 8.64, 17.28 |
| 30 | 24, 48 | 8.64, 17.28 |
| 60 | 48, 96 | 34.56, 69.12 |
| 120 | 24, 48 | 34.56, 69.12 |

Low tier UEs may not be able to support the bandwidth of CORESET #0 configured in the MIB. For example, a CORESET #0 bandwidth of 17 MHz would require SCS=15 kHz and 96 RBs, or SCS=30 kHz and 48 RBs. Low tier UEs may be configured to support a maximum bandwidth of 10 MHz. Thus, low tier UEs may not be able to support the CORESET #0 bandwidth of 17 MHz. A bandwidth of 5 MHz for low tier UEs may be sufficient for low tier UE applications. However, with reference to Table 1, the CORESET #0 for NR provides only one option that supports a bandwidth that is less than 5 MHz (e.g., bandwidth 4.32 MHz, 24 RBs, SCS=15 kHz), and only two options that support a bandwidth of 10 MHz (e.g., bandwidth 8.64 MHz, 48 RBs, SCS=15 kHz; and bandwidth 8.64 MHz, 24 RBs, SCS=30 kHz).

In order for a low tier UE with a bandwidth capability (e.g., 5, 10, or 20 MHz) to receive the CORESET #0, the network may need to configure a CORESET #0 that supports narrower bandwidths than the bandwidths supported in Table 1. One option may be to simply add more bandwidth options to a CORESET #0 configuration in the MIB. For example, Table 2 provides an update to Table 1 with the additional bandwidth options underlined.

TABLE 2

| Subcarrier spacing (kHz) | Supported # of RBs | Bandwidth (MHz) |
| --- | --- | --- |
| 15 | 24, 48, 96 | 4.32, 8.64, 17.28 |
| 30 | <u>12</u>, 24, 48 | <u>4.32</u>, 8.64, 17.28 |
| 60 | <u>6</u>, <u>12</u>, <u>24</u>, 48, 96 | <u>4.32</u>, <u>8.64</u>, <u>17.28</u>, 34.56, 69.12 |
| 120 | <u>3</u>, <u>6</u>, <u>12</u>, 24, 48 | <u>4.32</u>, <u>8.64</u>, <u>17.28</u>, 34.56, 69.12 |

The addition of more bandwidth options enables the bandwidth of 4.32 MHz is available to support low tier UEs, and the bandwidth of 4.32 MHz may also be configured to support premium UEs. As such, if both premium and low tier UEs are being served, the configuration of the initial CORESET may be constrained based on the bandwidth capability of lower tier UEs. Thus, when the base station configures a CORESET #0 for UE(s) having a bandwidth capability of only 5 MHz as well as for UE(s) having a larger bandwidth capability, the base station may use 3 RBs for a subcarrier spacing of 120 kHz that corresponds to a bandwidth of 4.32 MHz. The performance and/or throughput of premium UEs may be impacted, initially, until the premium UE is able to utilize a higher BW.

Another option may be to define a separate low tier CORESET #0 for low tier UEs having a lower bandwidth capability, in addition to a larger bandwidth CORESET #0 for UEs having a higher bandwidth capability, e.g. the existing CORESET #0. Thus, the UE may configure a different CORESET #0 for UEs of different bandwidth capabilities. A separate CORESET #0 may be defined for low tier UEs if the bandwidth of the larger bandwidth CORESET #0 is greater than a bandwidth that the low tier UE is able to handle, e.g., larger than the bandwidth capability of the UE. The CORESET #0 configuration includes at least two components, a frequency resource configuration and a time resource configuration. The frequency resource configuration (e.g., RBs) which may determine the BW of CORESET #0 and the specific RBs available for PDCCH monitoring in this CORESET #0. In some aspects, the BW of the low tier CORESET #0 may be selected within, or at least partially overlapping, the BW of the larger bandwidth CORESET #0. In some aspects, the low tier CORESET #0 and an larger bandwidth CORESET #0 may be centered at the same or roughly the same center frequency. In addition, the low tier and larger bandwidth CORESET #0 may also share the same 6 PRB grid. For example, in instances where only one low tier CORESET #0 is configured, the low tier CORESET #0 and the larger bandwidth CORESET #0 may share the same or roughly the same center frequency. However, in some aspects, the low tier CORESET #0 and the larger bandwidth CORESET #0 may have different center frequencies. For example, in instances where a plurality of low tier CORESET #0 are configured, the plurality of low tier CORESET #0s may be configured in a frequency multiplexing manner to occupy a wider bandwidth.

The time resource configuration may determine the allocation of time domain resources (e.g., symbols) in the low tier CORESET #0 that are used to monitor PDCCH in the symbols. In some aspects, as discussed in FIG. 4 below, the time resource configuration for the low tier CORESET #0 may be an independent time domain configuration separate from the larger bandwidth CORESET #0. For example, the low tier CORESET #0 may be assigned with different symbols than the larger bandwidth CORESET #0. In some aspects, the low tier CORESET #0 may be scheduled at a different rate that the larger bandwidth CORESET #0. For example, the low tier CORESET #0 may be scheduled more frequently or less frequently than the larger bandwidth CORESET #0. In some aspects, as discussed in FIG. 5 below, the time resource configuration for the low tier CORESET #0 may be configured only within symbols or a subset of symbols of the larger bandwidth CORESET #0. In another example, the low tier CORESET #0 may at least partially overlap in time with the larger bandwidth CORESET #0. In such aspects, the time resource configuration for the low tier CORESET #0 may be implicitly configured based on the time domain resource configuration of the larger bandwidth CORESET #0.

FIG. 4 is a diagram 400 illustrating an example of a time resource configuration in accordance with certain aspects of the disclosure. The diagram 400 illustrates a time resource configuration for a low tier CORESET #0. The diagram 400 includes the Synchronization Signal Block (SSB) 402, the larger bandwidth CORESET #0 404 and SIB 405, and the low tier CORESET #0 406 and low tier SIB 407, wherein the low tier CORESET #0 is a separate, independent configuration from the larger bandwidth CORESET #0. As shown in FIG. 4, in the frequency domain, the bandwidth of the low tier CORESET #0 406 is narrower than the bandwidth of the larger bandwidth CORESET #0 404. The bandwidth of the larger bandwidth CORESET #0 404 is wider than the bandwidth of the SSB 402. The low tier CORESET #0 has a narrower bandwidth than the larger bandwidth CORESET #0, because the low tier UE is not capable of monitoring as wide a bandwidth as premium UEs. In the aspect of FIG. 4, the low tier CORESET #0 is not within the time domain resource or symbols of the larger bandwidth CORESET #0. As such, the configuration of the time domain resources for the low tier CORESET #0 is independent from the larger bandwidth CORESET #0. Furthermore, although this example illustrates CORESET #0 406 as using a subset of the frequency resources of the larger bandwidth CORESET #0 404, the CORESET #0 406 may also use different frequency resources than larger bandwidth CORESET #0 404. In the aspect of FIG. 4, the configuration of the low tier CORESET #0 may comprise an explicit configuration, because the configuration of the low tier CORESET #0 is independent, at least partially or fully, to the configuration of the larger bandwidth CORESET #0. However, this explicit configuration may require additional bits in MIB in order to provide explicit configuration information for the low tier CORESET #0. A size of the MIB may be expanded to allow for the explicit configuration of the low tier CORESET #0.

In the example of FIG. 4, with a SCS of 30 kHz, the SSB 402 may have a bandwidth of 7.2 MHz and comprise 20 RBs. The larger bandwidth CORESET #0 404 may have a bandwidth of 17 MHz and may comprise 48 RBs. The low tier CORESET #0 406 may have a bandwidth of 10 MHz and comprise 28 RBs. In some aspects, the low tier CORESET #0 may be configured with 24 RBs and have a bandwidth of 8.6 MHz, which may support the monitoring of one aggregation level (AL) of 8 PDCCH candidate in the control region of a two symbol duration CORESET. Thus, 6 RBs for 1 symbol may be equal to 1 CCE. An aggregation level of 8, e.g., AL8=8 CCE=48 RB*symbol. The AL equals the number of CCEs for each PDCCH candidate.

Figure 5:
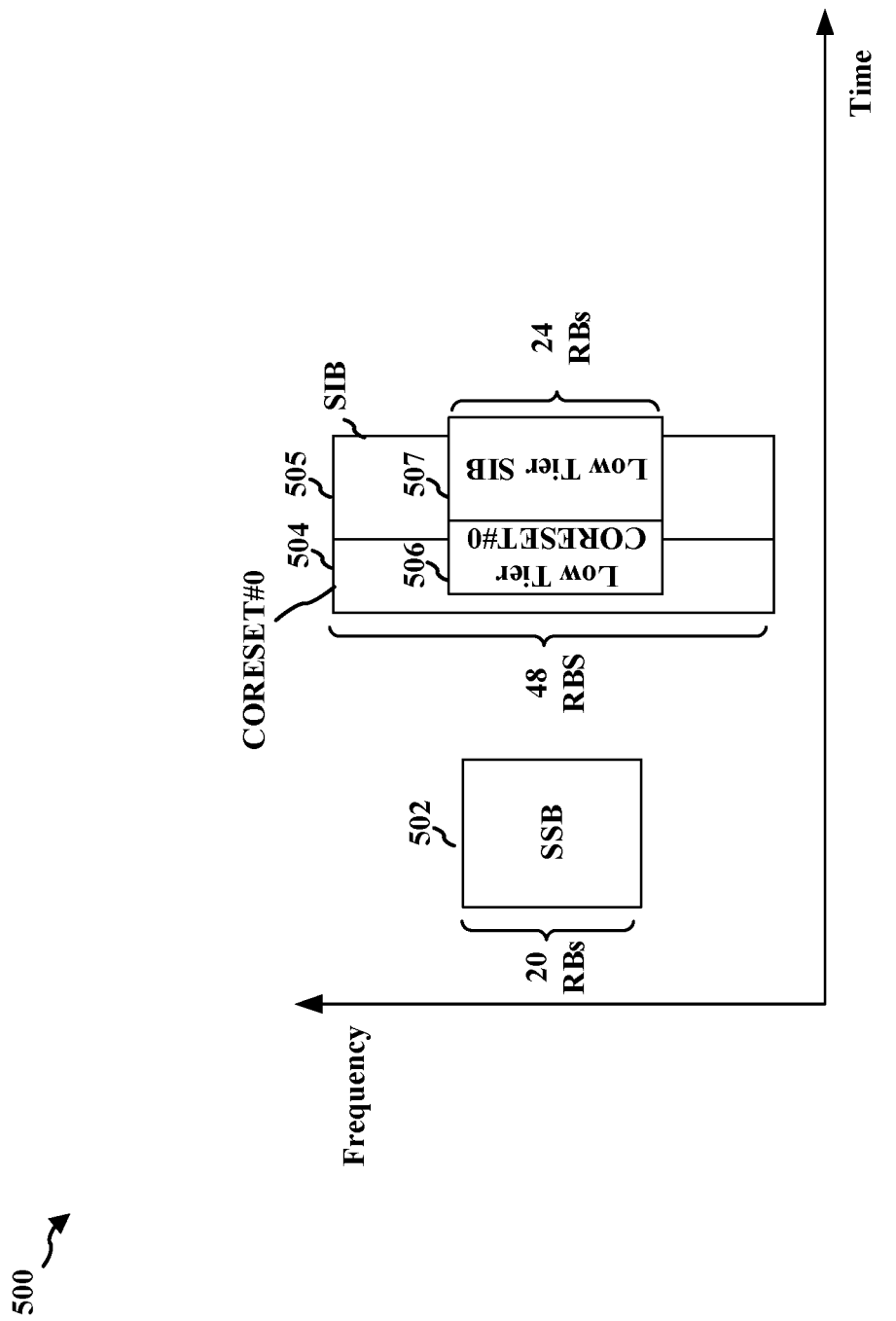
FIG. 5 is a diagram illustrating another example of a time resource configuration in accordance with certain aspects of the disclosure.

FIG. 5 is a diagram 500 illustrating an example of a time resource configuration in which the reduced bandwidth CORESET #0 506 overlaps in time and frequency with the larger bandwidth CORESET #0 504, in accordance with certain aspects of the disclosure. The diagram 500 illustrates a time resource configuration for a low tier CORESET #0 506. The diagram 500 includes the SSB 502, a larger bandwidth CORESET #0 504 and SIB 505, and the low tier CORESET #0 506 and low tier SIB 507, wherein the low tier CORESET #0 506 and the larger bandwidth CORESET #0 504 overlap in the time and frequency domain. The low tier CORESET #0 506 and the larger bandwidth CORESET #0 504 may occupy the same set of symbols or may CORESET #0 506 may at least partially overlap in time with larger bandwidth CORESET #0 504. The low tier CORESET #0 506 may be implicitly configured based, in part, on the time domain resource configuration of the larger bandwidth CORESET #0 504, due to the overlap in the time domain. In some aspects, the low tier CORESET #0 506 and the larger bandwidth CORESET #0 504 may occupy the same set of symbols.

In the aspect of FIG. 5, the configuration for the low tier CORESET #0 may be considered as an implicit configuration, because the configuration of the low tier CORESET #0 may be based on the configuration of the larger bandwidth CORESET #0. For example, the configuration of the low tier CORESET #0 may be fully mapped to the configuration of the larger bandwidth CORESET #0, such that the time and frequency resource assignments, as well as other configuration information for the low tier CORESET #0 and its associated SS set can be derived from the configuration of the larger bandwidth CORESET #0 and its associated SS set. At least one advantage of the implicit configuration is that additional configuration bits are not required for the MIB, such that the MIB does not need to be expanded to allow for additional information to indicate the configuration of the low tier CORESET #0. Instead, the UE may use the configuration information that is signaled for the larger bandwidth CORESET #0 504 to determine the parameters of a smaller bandwidth CORESET #0 506

Figure 6:
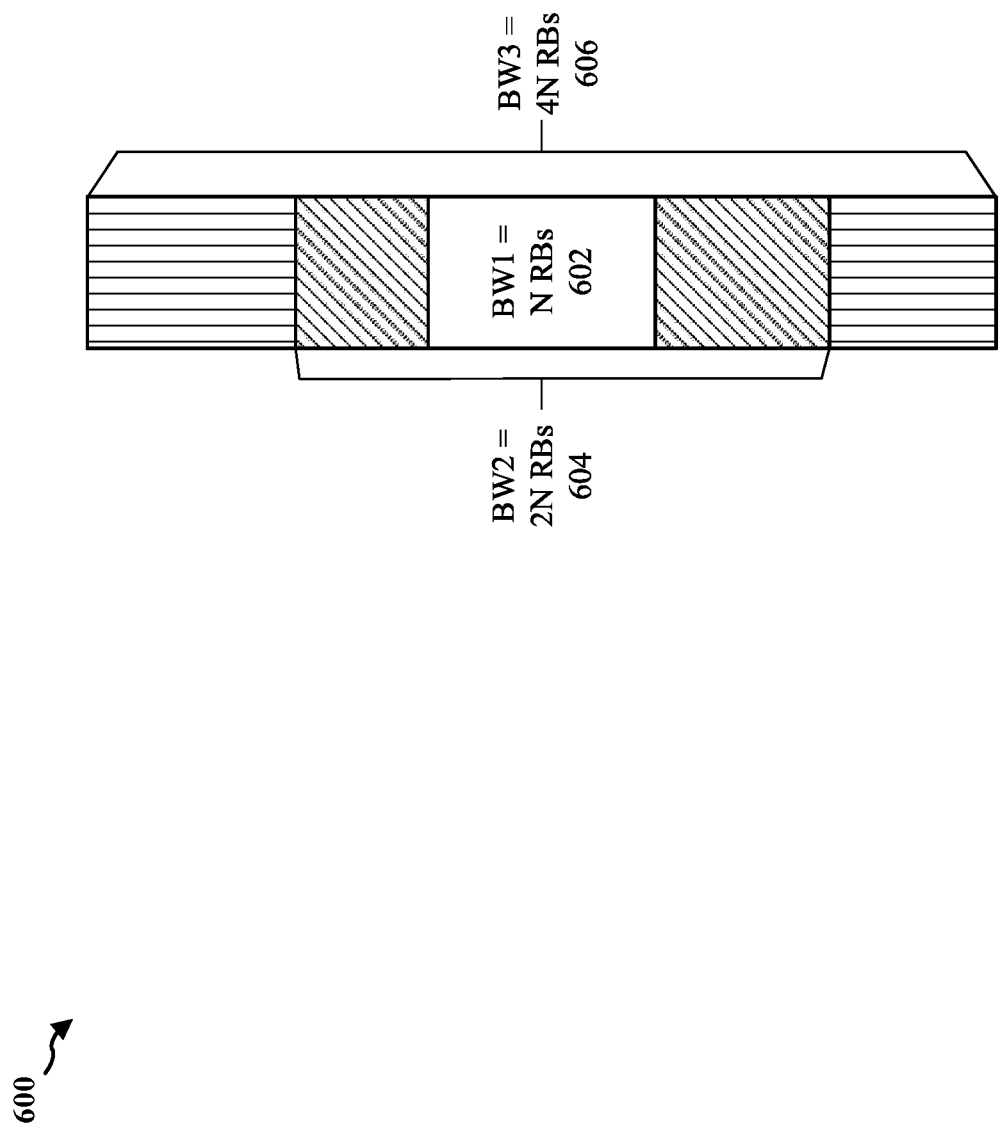
FIG. 6 is a diagram illustrating a nested CORESET in accordance with certain aspects of the disclosure.

FIG. 6 is a diagram 600 illustrating a nested CORESET #0 configuration in accordance with certain aspects of the disclosure. In some aspects, the base station may be configured to simultaneously serve multiple types of UEs, with each UE having different bandwidth capabilities (e.g., 5, 10, 20 MHz). The base station may be configured to maximize the CORESET #0 bandwidth for each bandwidth capability. For example, the base station may serve a UE having a 5 MHz bandwidth capability, as well as a UE having a 10 MHz bandwidth capability and a UE having a 20 MHz bandwidth capability. With reference to FIG. 6, a potential CORESET #0 frequency range for the low tier UE having a 5 MHz bandwidth capability is BW1 602, a potential CORESET #0 frequency range for the low tier UE having a 10 MHz bandwidth capability is BW2 604, and a potential CORESET #0 frequency range for the low tier UE having a 20 MHz bandwidth capability is BW3 606. In some aspects, in order to serve all three low tier UEs, the network can independently configure a different CORESET #0 for each different bandwidth capability. However, the configuration of three different CORESET #0 may be inefficient use of resources, because the same broadcast control information may be transmitted multiple times (e.g., three times in the example of three different CORESET #0). In order to configure CORESET #0 for multiple types of UEs having different bandwidth capabilities, the base station may build a relationship between the CORESET #0s for the different bandwidth capabilities. For example, the base station may establish a mapping relationship between the different bandwidth capabilities with the goal of reusing the PDCCH across the different bandwidth capabilities. Reusing the PDCCH would allow the base station to transmit the PDCCH once and the PDCCH may be monitored by the UEs with different bandwidth capabilities. A single PDCCH may be used to signal the same information to each of the different types of UEs in instances where the PDCCH is transmitted in overlapping bandwidth of the potential bandwidths for the control channel, e.g., BW1, BW2, BW3. In some aspects, the PDCCH may be transmitted within the BW1 602, such that the PDCCH meets the potential bandwidths of each of BW1, BW2, and BW3. As a result, the same PDCCH can be monitored by each UE, such that each UE may determine the configuration of the PDCCH candidate, as well as monitor and decode the PDCCH. In some aspects, a PDCCH may be transmitted within the BW2 604, but beyond BW1. In such aspect, the PDCCH can only be monitored and decoded by the UE having the BW2 capability and the UE having the BW3 capability, and not the UE having the BW1 capability since the PDCCH was transmitted beyond the bandwidth capability of the BW1 capability. In yet other aspects, the PDCCH may be transmitted only within BW3, such that only the UE having the BW3 capability may monitor and decode the PDCCH.

At least one approach to achieve the goal of reusing the PDCCH is to configure the CORESET #0s in a nested configuration, such that the bandwidth of different CORESET #0s for different low tier UEs having different bandwidth capabilities overlap. Maximizing the overlapping bandwidth of different CORESET #0s enhances the ability to reuse the PDCCH with multiple low tier UEs. In the aspect of FIG. 6, the three UEs have an example bandwidth capability of 5 MHz, 10 MHz, and 20 MHz, respectively and are being served by the same base station. The bandwidths are merely examples, and the aspects may be applied to any sets of UE having different bandwidth capabilities. To determine the RB allocation for PDCCH candidates, the base station may apply a rule for instances when you have a CORESET and a number of PDCCH candidates, such that PDCCH candidates may occupy a set of REs predefined in the specification and known by base station and UE. For example, for a configured aggregation level, suppose the number of PDCCH candidates is N1, N1+N2, and N1+N2+N3 for the BW capabilities, respectively. N1 may correspond to the lowest bandwidth capability, e.g., a lowest bandwidth capability may be 5 MHz. N2 may correspond to a second bandwidth capability, e.g., a second bandwidth capability may be 10 MHz. N3 may correspond to a third bandwidth capability, e.g., a third bandwidth capability may be 20 MHz. The base station may select a number of N1

PDCCH candidates from PDCCH candidates of all bandwidth capabilities. Then separately index the N1 PDCCH candidates from index 0 for each bandwidth capability. For each index 0≤i≤N1, map the PDCCH candidates with index i for these bandwidth capabilities to the time and frequency resources (e.g., RBs and symbols) in the center bandwidth BW1.

Next, the base station may select a number N2 PDCCH candidates from the remaining PDCCH candidates for each BW capability, and do the same as above in bandwidth BW2-BW1. In the present example, only the 10 MHz and 20 MHz low tier UEs may have remaining PDCCH candidates. Then, the base station may select a number of N3 PDCCH candidates from the remaining PDCCH candidates for each bandwidth capability, and repeat the same as above in bandwidth BW3-BW2. In the present example, only the 20 MHz low tier UE may have remaining PDCCH candidates.

For each step of RB allocation for PDCCH in each subband (e.g., BW1, BW2-BW1, BW3-BW2), the CCE allocation formula may use a number of PDCCH candidates equal to the number of PDCCH candidates mapped to the subband (e.g., N1 for BW1, N2 for BW2-BW1, N3 for BW3-BW2). If a bandwidth capability has non-zero but less than a number of remaining PDCCH candidates than other bandwidth capabilities, the maximum number of remaining PDCCH candidates for this subband across bandwidth capabilities may be used in the formula. The same Control Channel Element to Resource Element Group (CCE-to-REG) interleaving may be separately performed for each BW capability in each subband (e.g., separately for BW1, BW2-BW1, BW3-BW2). At least one advantage of the nested CORESET is that with only the overlapping bandwidth property, different bandwidth capabilities may effectively share the available bandwidth to the maximum extent. Yet another advantage is that the nested CORESET configuration may apply to CORESET #0 and other CORESETs if other CORESETs are configured for low tier UEs.

Figure 7:
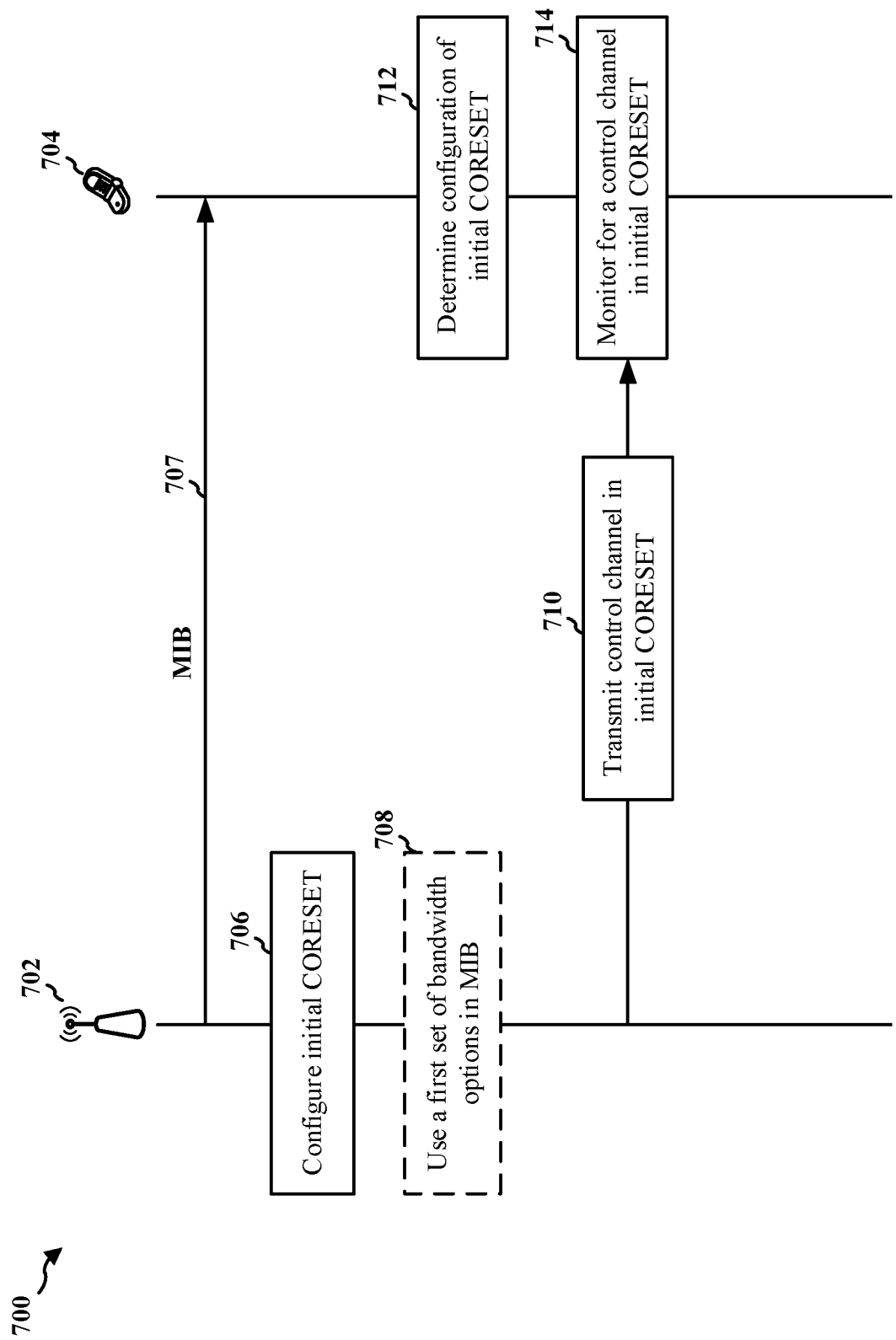
FIG. 7 illustrates an example communication flow between a base station and a UE.

FIG. 7 illustrates an example communication 700 flow between a base station and a UE. The base station can configure initial CORESET for one or more UE types. The base station 702 may correspond to, e.g., base station 102, 180, 310, apparatus 1002/1002'. The UE 704 may correspond to, e.g., UE 104, 350, 1050, 1350, apparatus 1602/1602'. The communication between the base station 702 and the UE 704 may comprise mmW communication and/or sub 6 GHz communication.

At 706, the base station 702 can configure an initial CORESET having a reduced bandwidth corresponding to a bandwidth capability of a first UE type. In some aspects, the reduced bandwidth may have a narrower frequency range than a bandwidth capability of a second UE type. At 708, the initial CORESET having the reduced bandwidth may be configured using a first set of bandwidth options in a MIB that are lower than a second set of bandwidth options in the MIB 707, e.g., as described in connection with Table 2. In some aspects, the first UE type may have a first bandwidth capability and the base station may serve at least one UE of the second UE type having a second bandwidth capability that is wider than the first bandwidth capability. The base station may configure the initial CORESET based on the first bandwidth capability of the first UE type. At 710, the base station 702 may transmit a control channel in the initial CORESET. At 712, the UE 704, may determine a configuration of the initial CORESET having the reduced bandwidth corresponding to a bandwidth capability of the first UE type. In some aspects, the reduced bandwidth may have a narrower frequency range than a bandwidth capability of a second UE type. At 714, the UE may monitor for a control channel from the base station in the initial CORESET.

Figure 8:
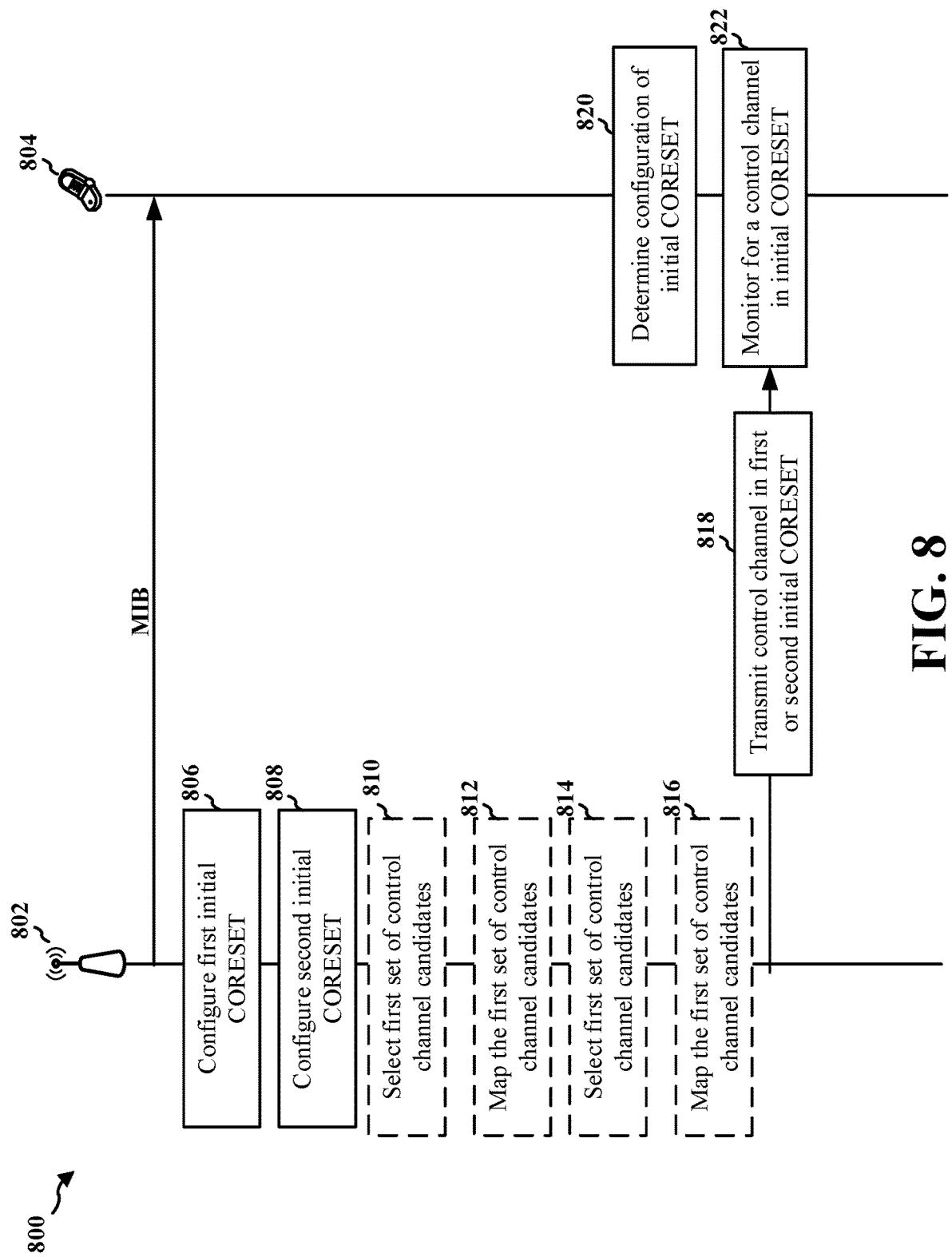
FIG. 8 illustrates another example communication flow between a base station and a UE.

FIG. 8 illustrates an example communication 800 flow between a base station 802 and a UE 804. The base station can configure a plurality of initial CORESETs for one or more UE types. The base station 802 may correspond to, e.g., base station 102, 180, 310, 1650, apparatus 1002/1002', 1302/1302'. The UE 804 may correspond to, e.g., UE 104, 350, 1050, 1350, apparatus 1602/1062'. The communication between the base station 802 and the UE 804 may comprise mmW communication and/or sub 6 GHz communication.

At 806, the base station 802 can configure a first initial CORESET for a first UE type having a first bandwidth capability. At 808, the base station 802 can configure a second initial CORESET for a second UE type having a second bandwidth capability that is lower than the first bandwidth capability, e.g., as described in connection with FIGS. 4, 5, and 6. In some aspects, the second initial CORESET may be configured based on the first initial CORESET having a larger bandwidth than the second bandwidth capability of the second UE type. In some aspects, the first initial CORESET may comprise a first frequency range. The second initial CORESET may comprise a second frequency range that is within the first frequency range, e.g., as illustrated in the examples of FIGS. 4-6. In some aspects, the first initial CORESET and the second initial CORESET may have a same center frequency. The first initial CORESET may comprise a first set of symbols in time. The second initial CORESET may comprise a second set of symbols that are not fully overlapping with the first set of symbols. The first initial CORESET may comprise a first set of symbols in time. The second initial CORESET may comprise a second set of symbols that are within with the first set of symbols. The second initial CORESET may be configured based on a configuration of at least one of the first initial CORESET or a Synchronization Signal (SS) set associated with the first initial CORESET. The second initial CORESET may be nested within at least one of frequency resources or time resources of the first initial CORESET, e.g., as described in connection with the example of FIG. 6. The control channel may be transmitted to UEs of the first UE type and the second UE type in the second initial CORESET.

At 810, the base station 802 may select a first set of control channel candidates from a plurality of control channel candidates based on the second bandwidth capability of the second UE type. At 812, the base station may map the first set of control channel candidates to time and frequency resources within a center bandwidth shared by the first initial CORESET and the second initial CORESET. At 814, the base station may select a second set of control channel candidates from remaining control channel candidates of the plurality of control channel candidates. At 816, the base station may map the second set of control channel candidates to time and frequency resources of the second initial CORESET that do not overlap the first initial CORESET. In some aspects, a first Control Channel Element (CCE) allocation for a first control channel transmission may be based on a first number of first set of control channel candidates and a second CCE allocation for a second control channel transmission may be based on a second number of the second set of control channel candidates. In some aspects, Control Channel Element to Resource Element Group (CCE-to-REG) interleaving may be performed separately for the center bandwidth shared by the first initial CORESET and the second initial CORESET and for a non-overlapping bandwidth of the second initial CORESET that does not overlap the first initial CORESET.

At 818, the base station may transmit a control channel in at least one of the first initial CORESET or the second initial CORESET. At 820, the UE 804 may determine a configuration of the first or second initial CORESET. At 822, the UE 804 may monitor for a control channel in the first or second initial CORESET.

Figure 9:
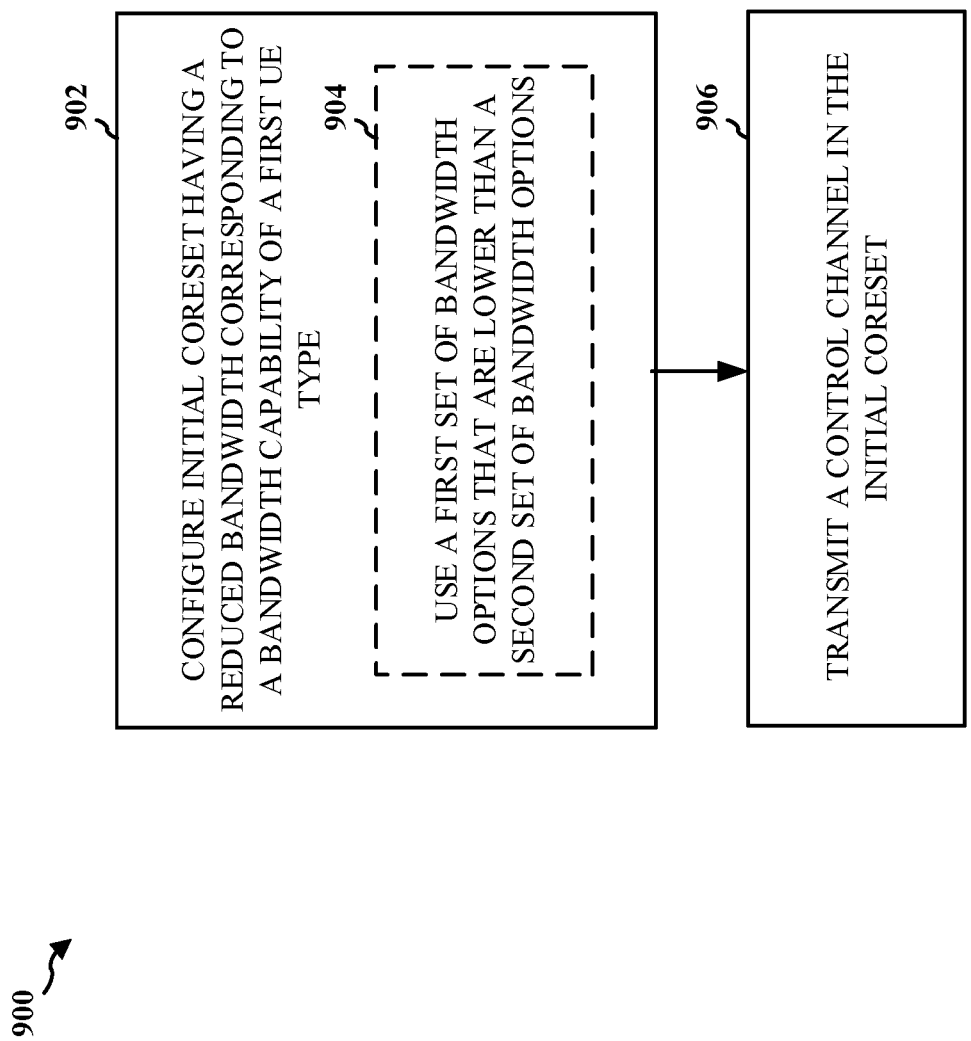
FIG. 9 is a flowchart of a method of wireless communication.

FIG. 9 is a flowchart 900 of a method of wireless communication. The method may be performed by a base station or a component of a base station (e.g., the base station 102, 180, 310; the apparatus 1002/1002'; the processing system 1114, which may include the memory 376 and which may be the entire base station 310 or a component of the base station 310, such as the TX processor 316, the RX processor 370, and/or the controller/processor 375). Optional aspects are illustrated with dashed lines. Aspects of the method may help a base station to configure an initial CORESET for multiple UE types, e.g., to meet the needs of different types of UEs. The method may provide a CORESET for a UE having reduced bandwidth capabilities. The method may help to reduce complexity and power use at the UE to monitor for PDCCH.

At 902, the base station may configure an initial CORESET having a reduced bandwidth corresponding to a bandwidth capability of a first UE type. For example, 902 may be performed by configuration component 1006 of apparatus 1002. The initial CORESET may be referred to as CORESET #0. The initial CORESET may be a CORESET that is configured based on a MIB. In some aspects, the reduced bandwidth may have a narrower frequency range than a bandwidth capability of a second UE type, e.g., as described in connection with Table 2. As illustrated at 904, the initial CORESET having the reduced bandwidth may be configured using a first set of bandwidth options in a MIB that are lower than a second set of bandwidth options in the MIB. For example, 904 may be performed by bandwidth component 1008 of apparatus 1002. In some aspects, the first UE type may have a first bandwidth capability and the base station may serve at least one UE of the second UE type having a second bandwidth capability that is wider than the first bandwidth capability. In some aspects, the base station may configure the initial CORESET based on the first bandwidth capability of the first UE type.

Finally, at 906, the base station may transmit a control channel in the initial CORESET. For example, 906 may be performed by transmission component 1010 of apparatus 1002. A UE may use the configuration of the CORESET to monitor for the control channel that is transmitted by the base station.

Figure 10:
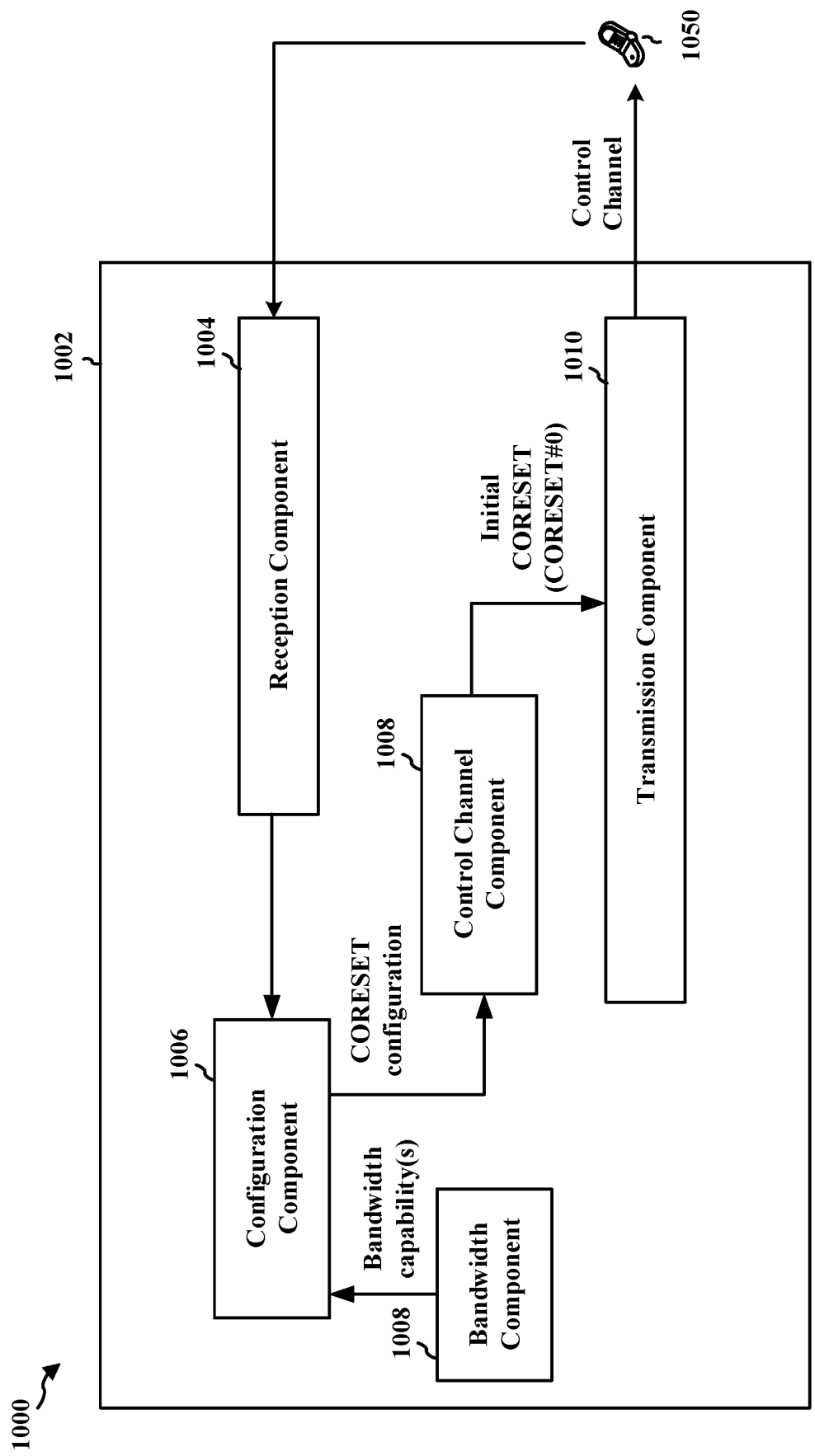
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station or a component of a base station (e.g., the base station 102, 180, 310; the apparatus 1002/1002'; the processing system 1114) in wireless communication with a UE 1050 (e.g., UE 104, 350). The apparatus includes a reception component 1004 that receives uplink communication from the UE 1050. The apparatus may include a configuration component 1006 that may be configured to configure an initial CORESET having a reduced bandwidth corresponding to a bandwidth capability of a first UE type, e.g., as described in connection with 902 of FIG. 9. In some aspects, the reduced bandwidth may have a narrower frequency range than a bandwidth capability of a second UE type. The apparatus may include a bandwidth component 1008 wherein the initial CORESET having the reduced bandwidth may be configured based on a first set of bandwidth options in a MIB that are lower than a second set of bandwidth option in the MIB, e.g., as described in connection with 904 of FIG. 9. The apparatus may include a transmission component 1010 that transmits a control channel in the initial CORESET, e.g., as described in connection with 906 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
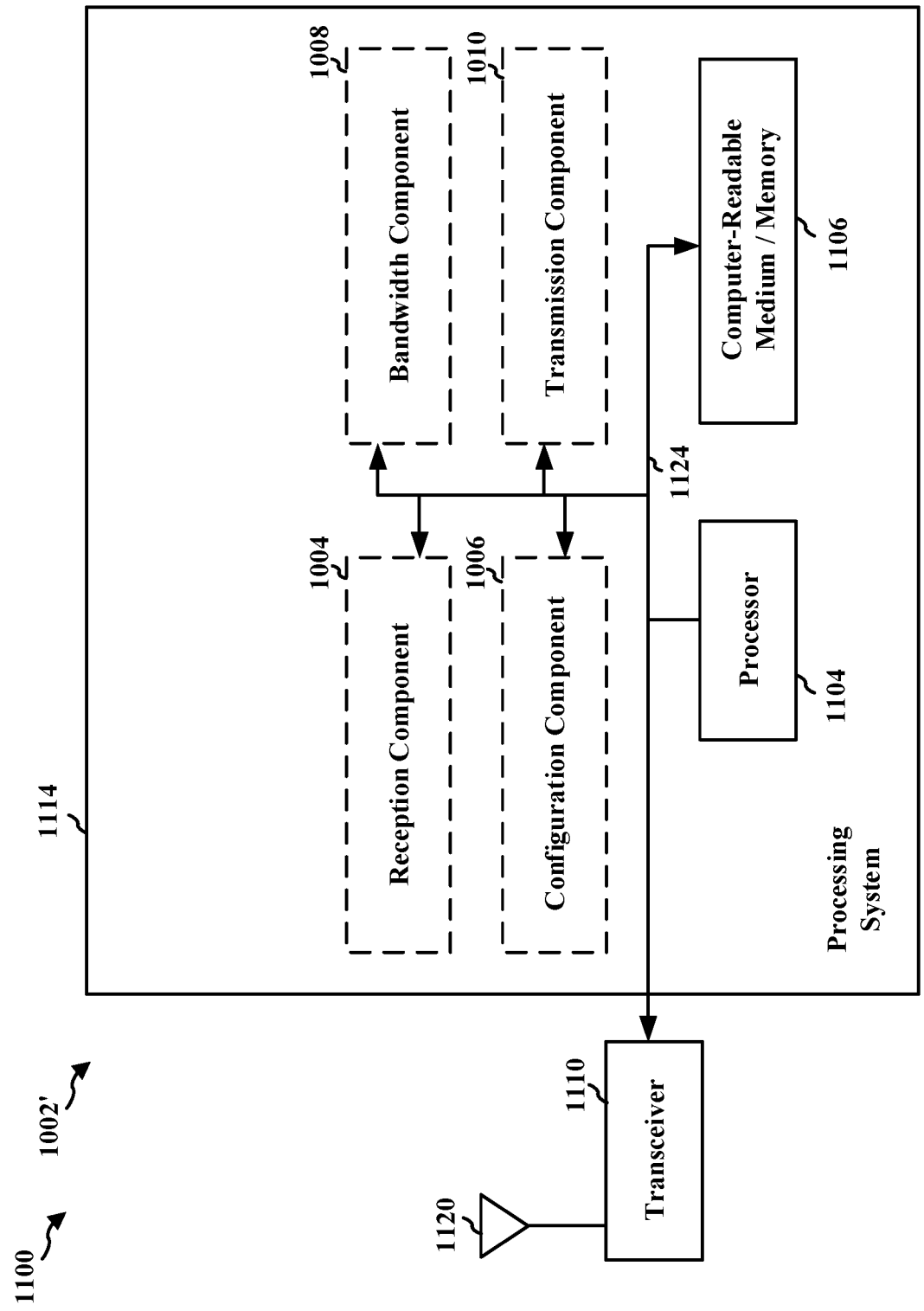
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication may include means for configuring an initial CORESET having a reduced bandwidth corresponding to a bandwidth capability of a first UE type. The reduced bandwidth having a narrower frequency range than a bandwidth capability of a second UE type. The apparatus 1002/1002' may include means for transmitting a control channel in the initial CORESET. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
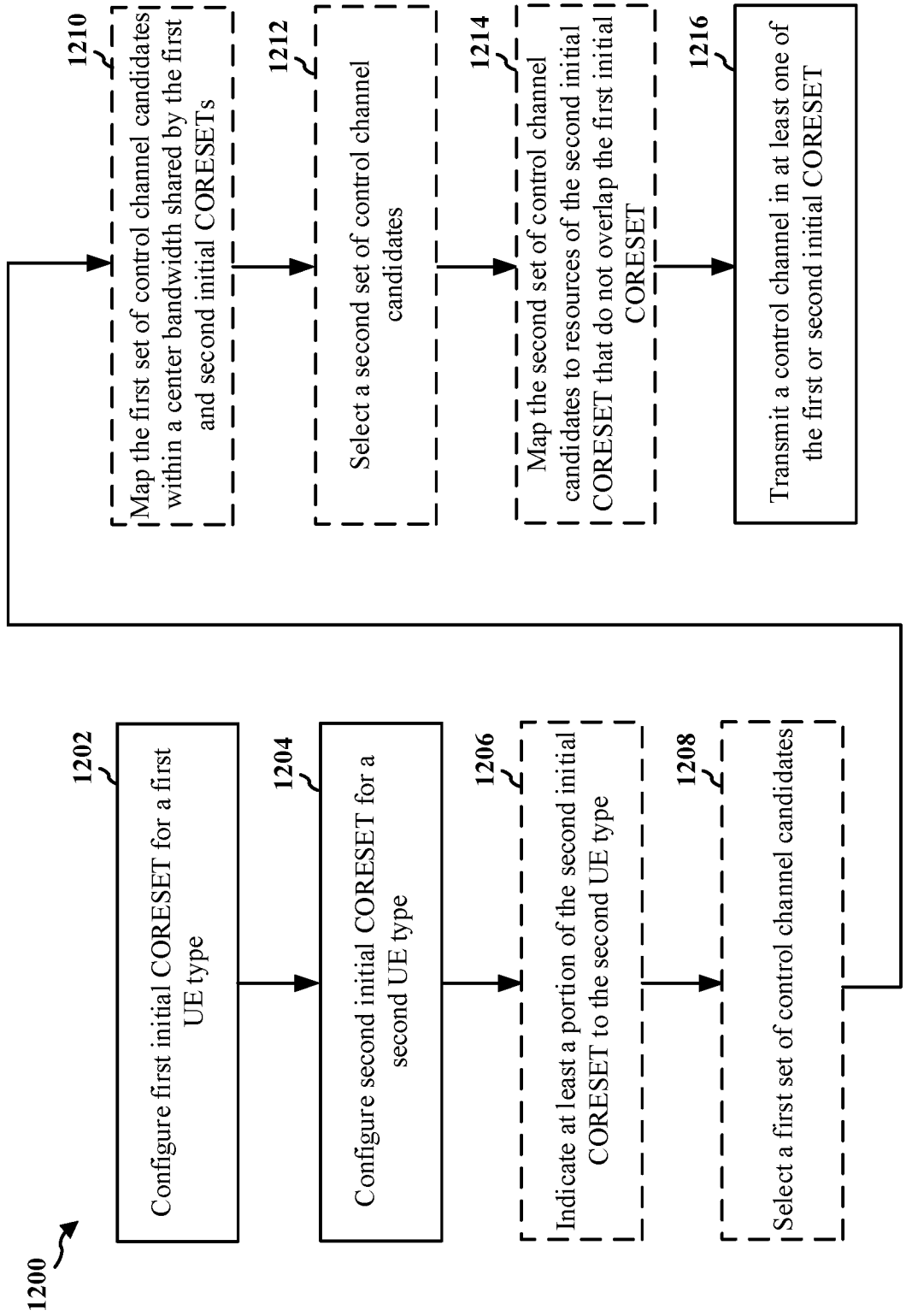
FIG. 12 is a flowchart of a method of wireless communication.

FIG. 12 is a flowchart 1200 of a method of wireless communication. The method may be performed by a base station or a component of a base station (e.g., the base station 102, 180, 310; the apparatus 1302/1302'; the processing system 1414, which may include memory 376 and which may be the entire base station 310 or a component of the base station 310, such as the TX processor 316, the RX processor 370, and/or the controller/processor 375). Optional aspects are illustrated with dashed lines. Aspects of the method may help a base station to configure multiple initial CORESETs for multiple UE types. The method may provide a CORESET for a UE having reduced bandwidth capabilities. The method may help to reduce complexity and power use at the UE to monitor for PDCCH.

At 1202, the base station may configure a first initial CORESET for a first UE type having a first bandwidth capability. For example, 1202 may be performed by first configuration component 1306 of apparatus 1302. Examples of a first initial CORESET are described in connection with CORESET #0 of 404, 504 in FIGS. 4 and 5.

At 1204, the base station may configure a second initial CORESET for at least a second UE type having a second bandwidth capability that is lower than the first bandwidth capability. For example, 1204 may be performed by second configuration component 1308 of apparatus 1302. Examples of a second initial CORESET are described in connection with CORESET #0 of 406, 506 in FIGS. 4 and 5. The initial CORESETs may be referred to as CORESET #0. The initial CORESETs may be CORESETs that are configured based on a MIB. In some aspects, the second initial CORESET may be configured based on the first initial CORESET having a larger bandwidth than the second bandwidth capability of the second UE type. In some aspects, the first initial CORESET may comprise a first frequency range, and the second initial CORESET may comprise a second frequency range that is within the first frequency range. The first initial CORESET and the second initial CORESET may have the same center frequency, e.g., as illustrated in the examples of FIG. 5 and FIG. 6. In some aspects, the first initial CORESET may comprise a first set of symbols in time, and the second initial CORESET may comprise a second set of symbols that do not fully overlap with the first set of symbols, e.g., as illustrated in the example of FIG. 4. In some aspects, the first initial CORESET may comprise a first set of symbols in time, and the second initial CORESET may comprise a second set of symbols that are at least partially within with the first set of symbols, e.g., as illustrated in the examples of FIGS. 5 and 6. In some aspects, the second initial CORESET may be configured based on a configuration of at least one of the first initial CORESET or a Synchronization Signal (SS) set associated with the first initial CORESET.

At 1206, the base station may indicate at least a portion of a configuration of the second initial CORESET to the second UE type. For example, 1206 may be performed by indication component 1310 of apparatus 1302. In some aspects, at least the portion of the configuration of the second initial CORESET may be indicated to the second UE type independent from configuration information for the first initial CORESET.

In some aspects, the second initial CORESET may be nested within at least one of frequency resources or time resources of the first initial CORESET, e.g., as illustrated in the example in FIG. 6. The control channel may be transmitted to UEs of the first UE type and the second UE type in the second initial CORESET.

At 1208, the base station may select a first set of control channel candidates from a plurality of control channel candidates based on the second bandwidth capability of the second UE type. For example, 1208 may be performed by first selection component 1312 of apparatus 1302. The base station may select the first set of control channel candidates in order to nest the first initial CORESET within the second initial CORESET.

At 1210, the base station may map the first set of control channel candidates to time and frequency resources. For example, 1210 may be performed by first map component 1314 of apparatus 1302. The base station may map the first set of control channel candidate to time and frequency resources within a center bandwidth shared by the first initial CORESET and the second initial CORESET.

At 1212, the base station may select a second set of control channel candidates. For example, 1212 may be performed by second selection component 1316 of apparatus 1302. The base station may select the second set of control channel candidates from the remaining control channel candidates of the plurality of control channel candidates.

At 1214, the base station may map the second set of control channel candidates to time and frequency resources of the second initial CORESET that do not overlap the first initial CORESET. For example, 1214 may be performed by second map component 1318 of apparatus 1302. The base station may nest a CORESET #0 for UE types having more than two bandwidth capabilities. FIG. 6 illustrates an example of three different levels of bandwidth capabilities. Thus, the base station may select a third set of control channel candidates and map them to a third set of time and frequency resources, e.g., 606. In some aspects, a first Control Channel Element (CCE) allocation for a first control channel transmission may be based on a first number of first set of control channel candidates, and a second CCE allocation for a second control channel transmission may be based on a second number of the second set of control channel candidates. In some aspects, a Control Channel Element to Resource Element Group (CCE-to-REG) interleaving may be performed separately for the center bandwidth shared by the first initial CORESET and the second initial CORESET and for a non-overlapping bandwidth of the second initial CORESET that does not overlap the first initial CORESET.

Finally, at 1216, the base station may be configured to transmit a control channel in at least one of the first initial CORESET or the second initial CORESET. For example, 1216 may be performed by transmission component 1320 of apparatus 1302. UE(s) may use the configuration(s) of the initial CORESET(s) to monitor for a control channel that is transmitted by the base station.

Figure 13:
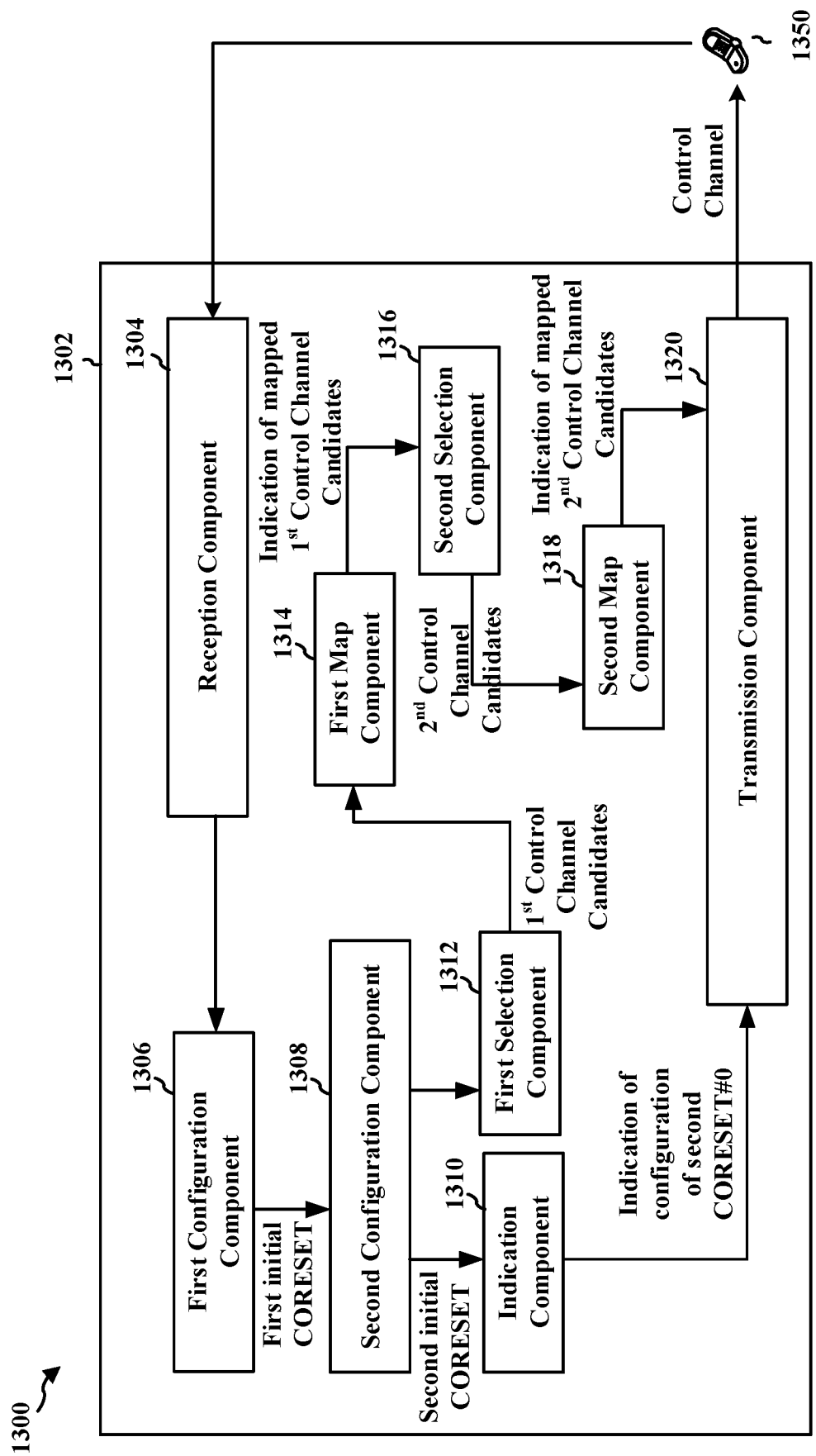
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station or a component of a base station (e.g., the base station 102, 180, 310; the apparatus 1302/1302'; the processing system 1414) in wireless communication with a UE 1350 (e.g., UE 104, 350). The apparatus includes a reception component 1304 that receives uplink communication from the UE 1350. The apparatus includes a first configuration component 1306 that configures a first initial CORESET for a first UE type having a first bandwidth capability, e.g., as described in connection with 1202 of FIG. 12. The apparatus includes a second configuration component 1308 that configures a second initial CORESET for at least a second UE type having a second bandwidth capability that may be lower than the first bandwidth capability, e.g., as described in connection with 1204 of FIG. 12. The apparatus may include an indication component 1310 configured to indicate at least a portion of the configuration of the second initial CORESET to the second UE type, e.g., as described in connection with 1206 of FIG. 12. The apparatus may include a first selection component 1312 configured to select a first set of control channel candidates, e.g., as described in connection with 1208 of FIG. 12. The apparatus may include a first map component 1314 configured to map the first set of control channel candidates to time and frequency resources within a center bandwidth shared by the first initial CORESET and the second initial CORESET, e.g., as described in connection with 1210 of FIG. 12. The apparatus may include a second selection component 1316 configured to select a second set of control channel candidates, e.g., as described in connection with 1212 of FIG. 12. The apparatus may include a second map component 1318 configured to map the second set of control channel candidates to time and frequency resources of the second initial CORESET that do not overlap with the first initial CORESET, e.g., as described in connection with 1214 of FIG. 12. The apparatus includes a transmission component 1308 that may transmit a control channel in at least one of the first initial CORESET or the second initial CORESET, e.g., as described in connection with 1216 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
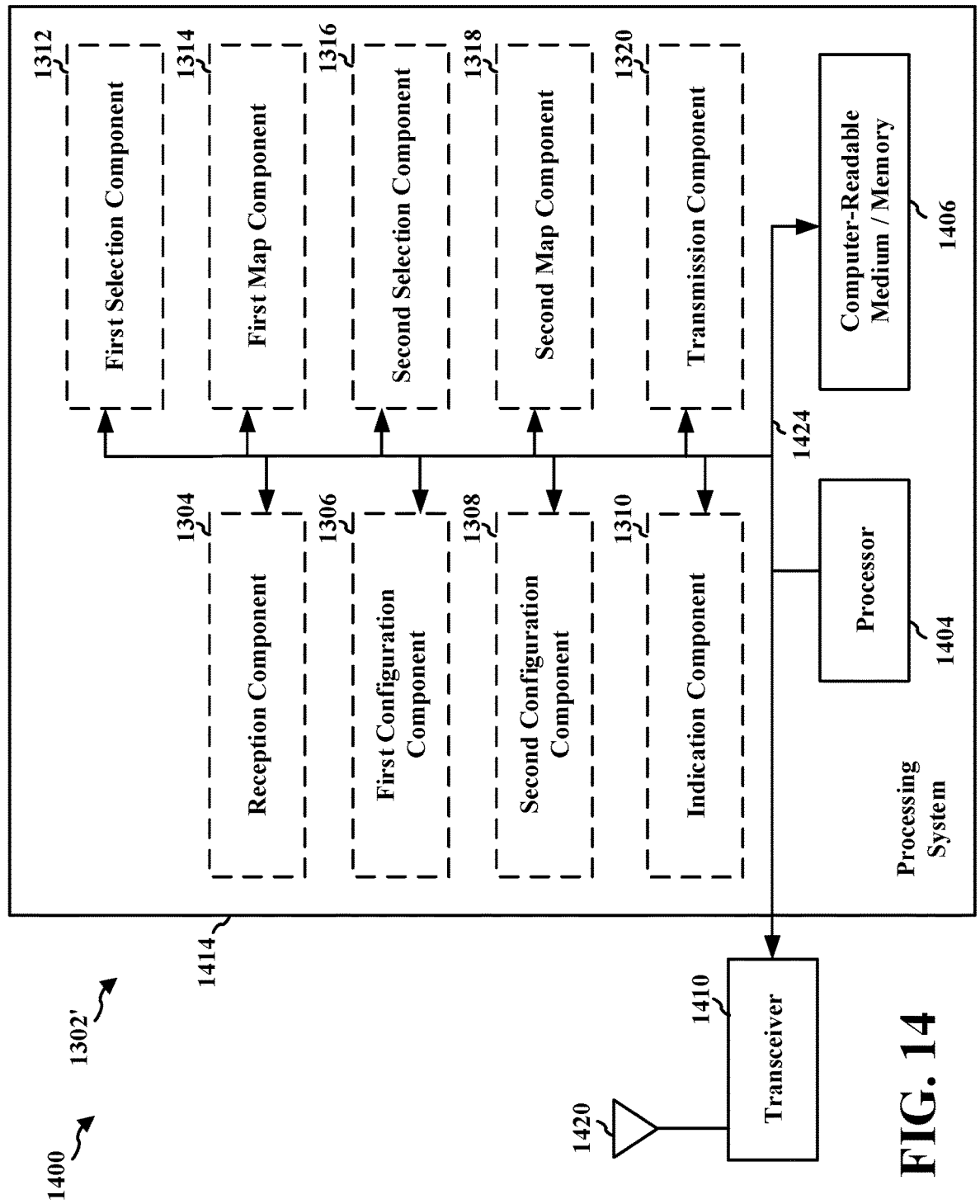
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, 1320 and the computer-readable medium/memory 1406. The bus 1324 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1320, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318, 1320. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication may include means for configuring a first initial CORESET for the first UE type having a first bandwidth capability. The apparatus 1302/1302' may include means for configuring a second initial CORESET for at least the second UE type having a second bandwidth capability that is lower than the first bandwidth capability. The apparatus 1302/1302' may include means for transmitting a control channel in at least one of the first initial CORESET or the second initial CORESET. The apparatus 1302/1302' may further include means for indicating at least a portion of a configuration of the second initial CORESET to the second UE type. The apparatus 1302/1302' may further include means for selecting a first set of control channel candidates from a plurality of control channel candidates based on the second bandwidth capability of the second UE type. The apparatus 1302/1302' may further include means for mapping the first set of control channel candidates to time and frequency resources within a center bandwidth shared by the first initial CORESET and the second initial CORESET. The apparatus 1302/1302' may further include means for selecting a second set of control channel candidates from the remaining control channel candidates of the plurality of control channel candidates. The apparatus 1302/1302' may further include means for mapping the second set of control channel candidates to time and frequency resources of the second initial CORESET that do not overlap the first initial CORESET. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
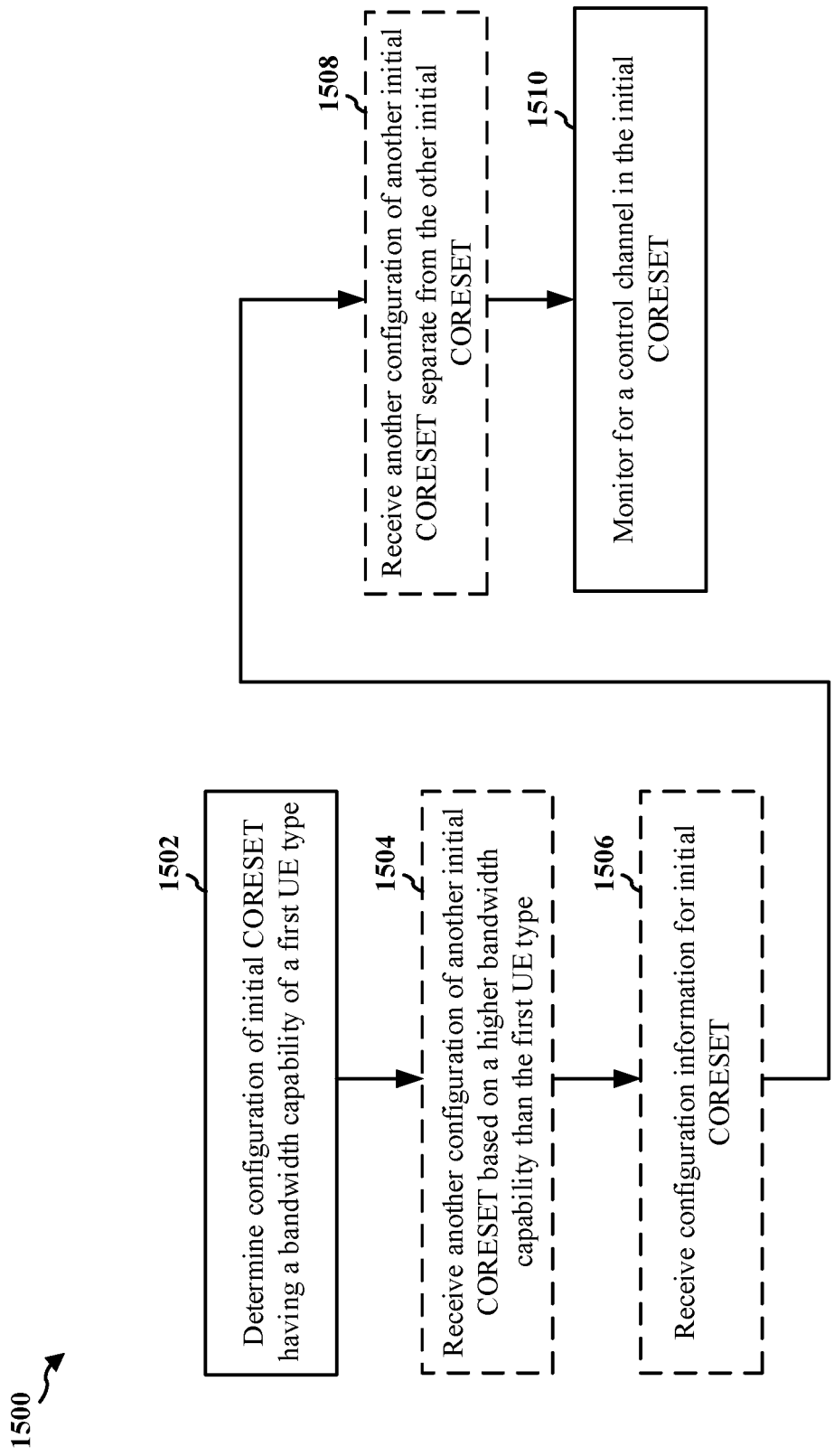
FIG. 15 is a flowchart of a method of wireless communication.

FIG. 15 is a flowchart 1500 of a method of wireless communication. The method may be performed by a UE or a component of a UE (e.g., the UE 104, 350, 704, 804, 1050, 1350; the apparatus 1602/1602'; the processing system 1714, which may include the memory 360 and which may be the entire UE 350 or a component of the UE 350, such as the TX processor 368, the RX processor 356, and/or the controller/processor 359). Optional aspects are illustrated with dashed lines. Aspects of the method may help a UE to receive and decode initial CORESETs, e.g., when a base station has configured different CORESET(s) to meet the needs of UEs having different bandwidth capabilities.

At 1502, the UE may be configured to determine a configuration of an initial CORESET having a reduced bandwidth corresponding to a bandwidth of the first UE type. For example, 1502 may be performed by determination component 1606 of apparatus 1602. The initial CORESET may be referred to as CORESET #0. The initial CORESET may be a CORESET that is configured based on a MIB. The reduced bandwidth may have a narrower frequency range than a bandwidth capability of a second UE type, e.g., as described in connection with FIGS. 4-6.

At 1504, the UE may be configured to receive another configuration of another initial CORESET from the base station. For example, 1504 may be performed by reception component 1604 of apparatus 1602. The other initial CORESET configuration may be based on a higher bandwidth capability than the bandwidth capability of the first UE type. The UE may determine the configuration of the initial CORESET having the reduced bandwidth based at least partially on the other configuration of the other initial CORESET.

At 1506, the UE may receive configuration information for the initial CORESET from the base station. For example, 1506 may be performed by reception component 1604 of apparatus 1602. The UE may determine at least a portion of the configuration of the initial CORESET based on the configuration information received from the base station. This configuration information may be provided to the UE independent of configuration information for an initial CORESET for UEs having a higher bandwidth capability.

At 1508, the UE may receive another configuration of another initial CORESET from the base station. For example, 1508 may be performed by reception component 1604 of apparatus 1602. The other initial CORESET may be based on a higher bandwidth capability than the bandwidth capability of the first UE type. The configuration information for the initial CORESET received from the base station may be separate from the other configuration of the other initial CORESET.

At 1510, the UE may monitor for a control channel from the base station in the initial CORESET. For example, 1510 may be performed by monitor component 1608 of apparatus 1602. The UE may further receive the control channel from the base station in the initial CORESET monitored by the UE, e.g., as illustrated at 818 in FIG. 8.

Figure 16:
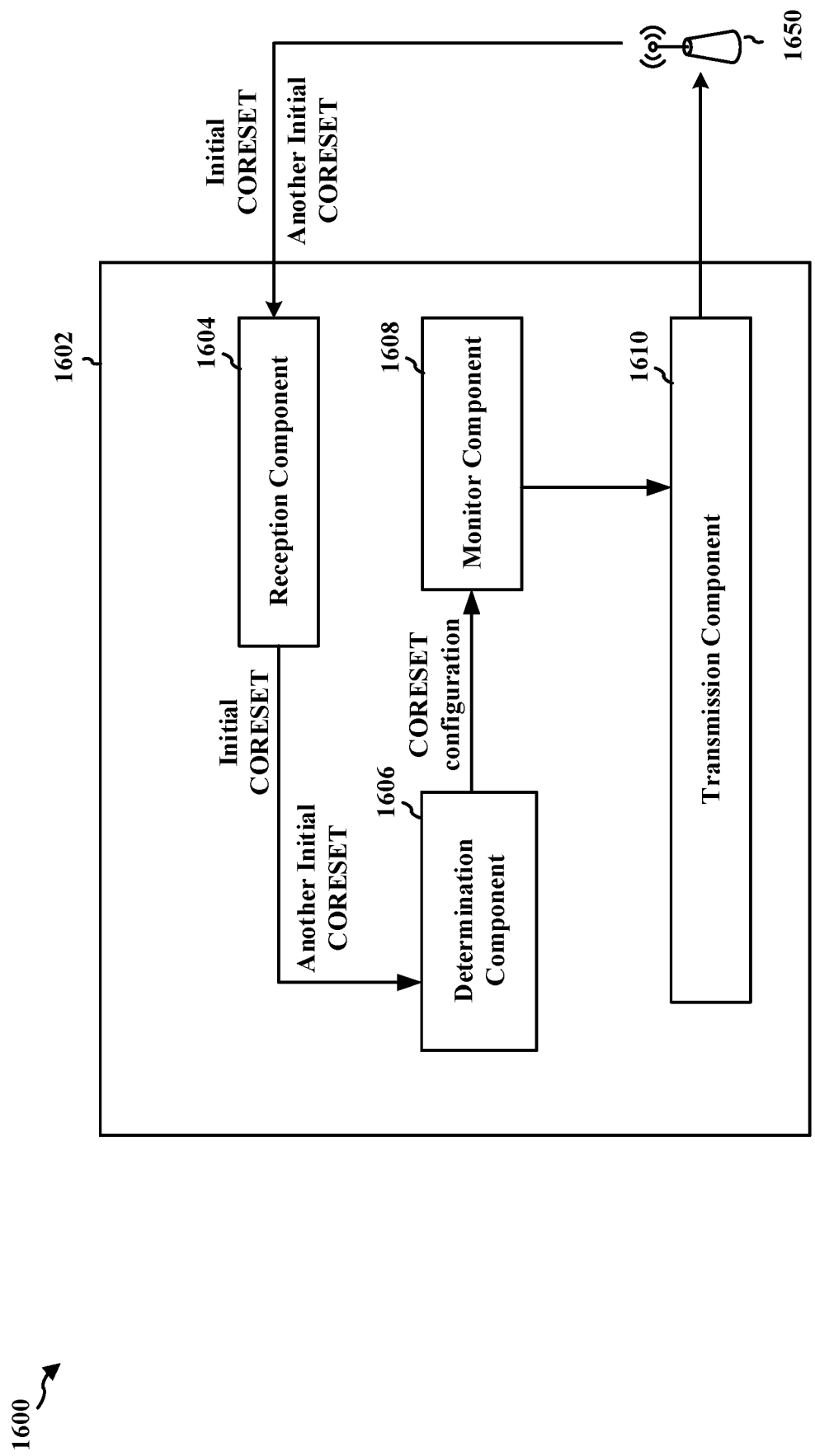
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a UE or a component of a UE (e.g., UE 104, 350, 704, 804, 1050, 1350; apparatus 1602/1602'; the processing system 1714) in wireless communication with a base station 1650 (e.g., the base station 102, 180, 310; the apparatuses 1002/1002', 1302/1302'; the processing systems 1114, 1414). The apparatus includes a reception component 1604 that receives downlink communication from the base station 1650. The reception component 1604 may be configured to receive another configuration of another initial CORESET from the base station 1650, e.g., as described in connection with 1504 of FIG. 15. The reception component 1604 may be configured to receive configuration information for the initial CORESET from the base station 1650, e.g., as described in connection with 1506 of FIG. 15. The reception component 1604 may be configured to receive another configuration of another initial CORESET from the base station 1650, e.g., as described in connection with 1508 of FIG. 15. The apparatus may include a determination component 1606 that may determine a configuration of an initial CORESET having a reduced bandwidth corresponding to a bandwidth capability of the first UE type, e.g., as described in connection with 1502 of FIG. 15. The apparatus may include a monitor component 1608 configured to monitor for a control channel from the base station in the initial CORESET, e.g., as described in connection with 1510 of FIG. 15. The apparatus may include a transmission component 1610 that transmits uplink communication to the base station 1650.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
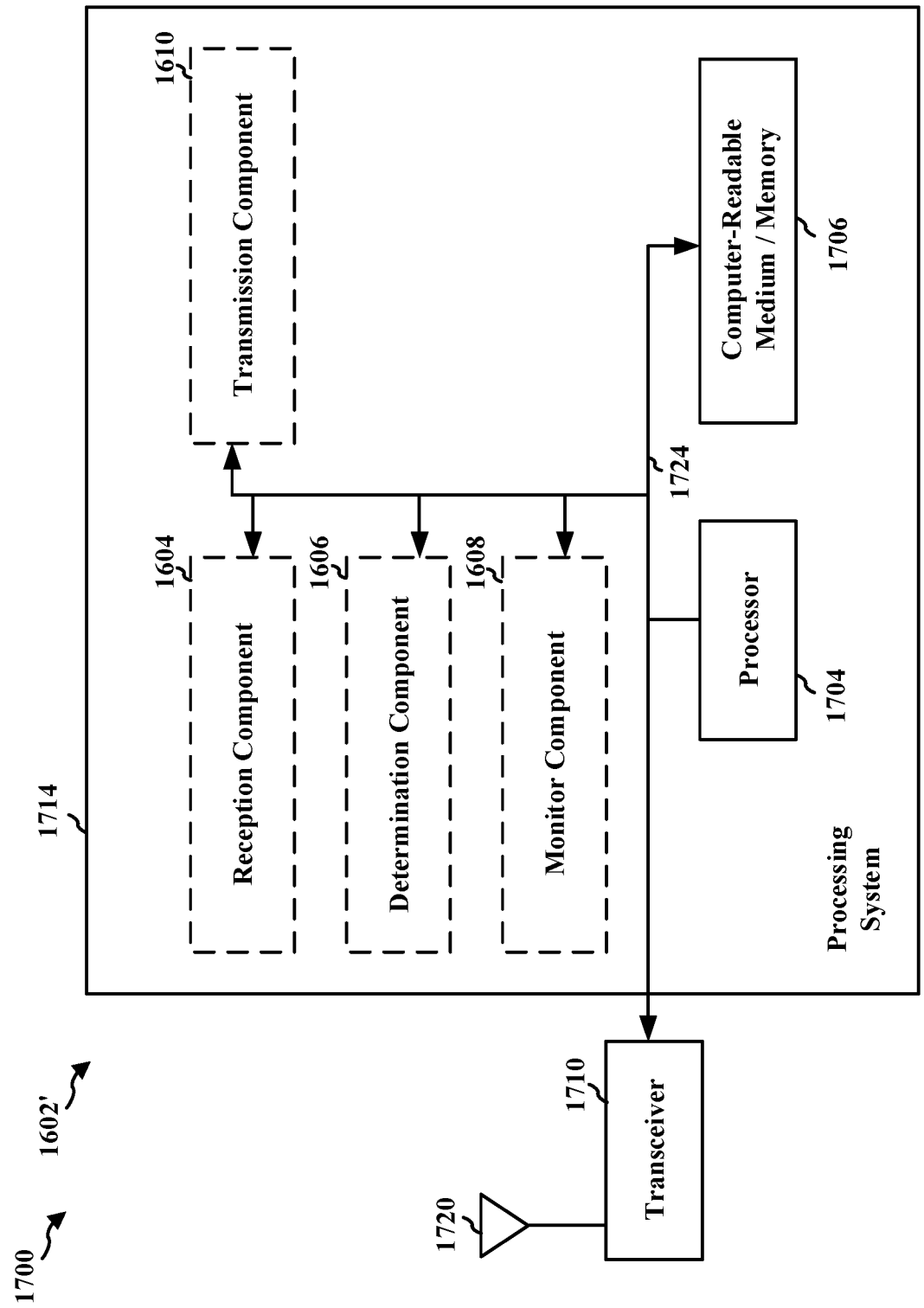
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication may include means for determining a configuration of an initial CORESET having a reduced bandwidth corresponding to a bandwidth capability of the first UE type. The reduced bandwidth having a narrower frequency range than a bandwidth capability of a second UE type. The apparatus 1602/1602' may include means for monitoring for a control channel from a base station in the initial CORESET. The apparatus 1602/1602' may further include means for receiving another configuration of another initial CORESET from the base station. The other initial CORESET may be based on a higher bandwidth capability than the bandwidth capability of the first UE type. The UE may determine the configuration of the initial CORESET having the reduced bandwidth based at least partially on the other configuration of the other initial CORESET. The apparatus 1602/1602' may further include means for receiving configuration information for the initial CORESET from the base station. The UE may determine at least a portion of the configuration of the initial CORESET based on the configuration information received from the base station. The apparatus 1602/1602' may further include means for receiving another configuration of another initial CORESET from the base station. The other initial CORESET may be based on a higher bandwidth capability than the bandwidth capability of the first UE type. The configuration information for the initial CORESET received from the base station may be separate from the other configuration of the other initial CORESET. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    configuring a first initial Control Resource Set (CORESET) for a first User Equipment (UE) type having a first bandwidth capability;
    configuring a second initial CORESET for at least a second UE type having a second bandwidth capability that is lower than the first bandwidth capability; and
    transmitting a control channel in at least one of the first initial CORESET or the second initial CORESET,
    wherein the first initial CORESET comprises a first frequency range, and wherein the second initial CORESET comprises a second frequency range that is within the first frequency range.

2. The method of claim 1, wherein the first initial CORESET and the second initial CORESET have a same center frequency.

3. A method of wireless communication at a base station, comprising:
    configuring a first initial Control Resource Set (CORESET) for a first User Equipment (UE) type having a first bandwidth capability;
    configuring a second initial CORESET for at least a second UE type having a second bandwidth capability that is lower than the first bandwidth capability; and
    transmitting a control channel in at least one of the first initial CORESET or the second initial CORESET, wherein the first initial CORESET comprises a first set of symbols in time, and wherein the second initial CORESET comprises a second set of symbols that are within with the first set of symbols.

4. A method of wireless communication at a base station, comprising:
configuring a first initial Control Resource Set (CORESET) for a first User Equipment (UE) type having a first bandwidth capability;
configuring a second initial CORESET for at least a second UE type having a second bandwidth capability that is lower than the first bandwidth capability; and
transmitting a control channel in at least one of the first initial CORESET or the second initial CORESET,
wherein the second initial CORESET is nested within at least one of frequency resources or time resources of the first initial CORESET, and wherein the control channel is transmitted to UEs of the first UE type and the second UE type in the second initial CORESET.

5. The method of claim 4, further comprising: selecting a first set of control channel candidates from a plurality of control channel candidates based on the second bandwidth capability of the second UE type;
mapping the first set of control channel candidates to time and frequency resources within a center bandwidth shared by the first initial CORESET and the second initial CORESET;
selecting a second set of control channel candidates from remaining control channel candidates of the plurality of control channel candidates; and
mapping the second set of control channel candidates to time and frequency resources of the second initial CORESET that do not overlap the first initial CORESET.

6. The method of claim 5, wherein a first Control Channel Element (CCE) allocation for a first control channel transmission is based on a first number of first set of control channel candidates and a second CCE allocation for a second control channel transmission is based on a second number of the second set of control channel candidates.

7. The method of claim 5, wherein Control Channel Element to Resource Element Group (CCE-to-REG) interleaving is performed separately for the center bandwidth shared by the first initial CORESET and the second initial CORESET and for a non-overlapping bandwidth of the second initial CORESET that does not overlap the first initial CORESET.

8. An apparatus for wireless communication at a base station, comprising:
means for configuring a first initial Control Resource Set (CORESET) for a first User Equipment (UE) type having a first bandwidth capability;
means for configuring a second initial CORESET for at least a second UE type having a second bandwidth capability that is lower than the first bandwidth capability; and
means for transmitting a control channel in at least one of the first initial CORESET or the second initial CORESET,
wherein the first initial CORESET comprises a first frequency range, and wherein the second initial CORESET comprises a second frequency range that is within the first frequency range.

9. The apparatus of claim 8, wherein the first initial CORESET and the second initial CORESET have a same center frequency.

10. An apparatus for wireless communication at a base station, comprising:
means for configuring a first initial Control Resource Set (CORESET) for a first User Equipment (UE) type having a first bandwidth capability;
means for configuring a second initial CORESET for at least a second UE type having a second bandwidth capability that is lower than the first bandwidth capability; and
means for transmitting a control channel in at least one of the first initial CORESET or the second initial CORESET,
wherein the first initial CORESET comprises a first set of symbols in time, and wherein the second initial CORESET comprises a second set of symbols that are within with the first set of symbols.

11. An apparatus for wireless communication at a base station, comprising:
means for configuring a first initial Control Resource Set (CORESET) for a first User Equipment (UE) type having a first bandwidth capability;
means for configuring a second initial CORESET for at least a second UE type having a second bandwidth capability that is lower than the first bandwidth capability; and
means for transmitting a control channel in at least one of the first initial CORESET or the second initial CORESET,
wherein the second initial CORESET is nested within at least one of frequency resources or time resources of the first initial CORESET, and wherein the control channel is transmitted to UEs of the first UE type and the second UE type in the second initial CORESET.

12. The apparatus of claim 11, further comprising:
means for selecting a first set of control channel candidates from a plurality of control channel candidates based on the second bandwidth capability of the second UE type;
means for mapping the first set of control channel candidates to time and frequency resources within a center bandwidth shared by the first initial CORESET and the second initial CORESET;
means for selecting a second set of control channel candidates from remaining control channel candidates of the plurality of control channel candidates; and
means for mapping the second set of control channel candidates to time and frequency resources of the second initial CORESET that do not overlap the first initial CORESET.

13. The apparatus of claim 12, wherein a first Control Channel Element (CCE) allocation for a first control channel transmission is based on a first number of first set of control channel candidates and a second CCE allocation for a second control channel transmission is based on a second number of the second set of control channel candidates.

14. The apparatus of claim 12, wherein Control Channel Element to Resource Element Group (CCE-to-REG) interleaving is performed separately for the center bandwidth shared by the first initial CORESET and the second initial CORESET and for a non-overlapping bandwidth of the second initial CORESET that does not overlap the first initial CORESET.

15. An apparatus for wireless communication at a base station, comprising:
a memory; and
at least one processor coupled to the memory and configured to:

configure a first initial Control Resource Set (CORESET) for a first User Equipment (UE) type having a first bandwidth capability;

configure a second initial CORESET for at least the second UE type having a second bandwidth capability that is lower than the first bandwidth capability; and transmit a control channel in at least one of the first initial CORESET or the second initial CORESET, wherein the first initial CORESET comprises a first frequency range, and wherein the second initial CORESET comprises a second frequency range that is within the first frequency range.

16. The apparatus of claim 15, wherein the first initial CORESET and the second initial CORESET have a same center frequency.

17. An apparatus for wireless communication at a base station, comprising:
a memory; and
at least one processor coupled to the memory and configured to:
configure a first initial Control Resource Set (CORESET) for a first User Equipment (UE) type having a first bandwidth capability;
configure a second initial CORESET for at least the second UE type having a second bandwidth capability that is lower than the first bandwidth capability; and
transmit a control channel in at least one of the first initial CORESET or the second initial CORESET,
wherein the first initial CORESET comprises a first set of symbols in time, and wherein the second initial CORESET comprises a second set of symbols that are within with the first set of symbols.

18. An apparatus for wireless communication at a base station, comprising:
a memory; and
at least one processor coupled to the memory and configured to:
configure a first initial Control Resource Set (CORESET) for a first User Equipment (UE) type having a first bandwidth capability;
configure a second initial CORESET for at least the second UE type having a second bandwidth capability that is lower than the first bandwidth capability; and
transmit a control channel in at least one of the first initial CORESET or the second initial CORESET,
wherein the second initial CORESET is nested within at least one of frequency resources or time resources of the first initial CORESET, and wherein the control channel is transmitted to UEs of the first UE type and a second UE type in the second initial CORESET.

19. The apparatus of claim 18, the at least one processor further configured to:
select a first set of control channel candidates from a plurality of control channel candidates based on the second bandwidth capability of the second UE type;
map the first set of control channel candidates to time and frequency resources within a center bandwidth shared by the first initial CORESET and the second initial CORESET;
select a second set of control channel candidates from remaining control channel candidates of the plurality of control channel candidates; and
map the second set of control channel candidates to time and frequency resources of the second initial CORESET that do not overlap the first initial CORESET.

20. The apparatus of claim 19, wherein a first Control Channel Element (CCE) allocation for a first control channel transmission is based on a first number of first set of control channel candidates and a second CCE allocation for a second control channel transmission is based on a second number of the second set of control channel candidates.

21. The apparatus of claim 19, wherein Control Channel Element to Resource Element Group (CCE-to-REG) interleaving is performed separately for the center bandwidth shared by the first initial CORESET and the second initial CORESET and for a non-overlapping bandwidth of the second initial CORESET that does not overlap the first initial CORESET.

22. A non-transitory computer-readable medium storing computer executable code for wireless communication at a base station, the code when executed by a processor cause the processor to:
configure a first initial Control Resource Set (CORESET) for a first User Equipment (UE) type having a first bandwidth capability;
configure a second initial CORESET for at least a second UE type having a second bandwidth capability that is lower than the first bandwidth capability; and
transmit a control channel in at least one of the first initial CORESET or the second initial CORESET,
wherein the first initial CORESET comprises a first frequency range, and wherein the second initial CORESET comprises a second frequency range that is within the first frequency range.

23. A non-transitory computer-readable medium storing computer executable code for wireless communication at a base station, the code when executed by a processor cause the processor to:
configure a first initial Control Resource Set (CORESET) for a first User Equipment (UE) type having a first bandwidth capability;
configure a second initial CORESET for at least a second UE type having a second bandwidth capability that is lower than the first bandwidth capability; and
transmit a control channel in at least one of the first initial CORESET or the second initial CORESET,
wherein the first initial CORESET comprises a first set of symbols in time, and wherein the second initial CORESET comprises a second set of symbols that are within with the first set of symbols.

24. A non-transitory computer-readable medium storing computer executable code or wireless communication at a base station, the code when executed by a processor cause the processor to:
configure a first initial Control Resource Set (CORESET) for a first User Equipment (UE) type having a first bandwidth capability;
configure a second initial CORESET for at least a second UE type having a second bandwidth capability that is lower than the first bandwidth capability; and
transmit a control channel in at least one of the first initial CORESET or the second initial CORESET,
wherein the second initial CORESET is nested within at least one of frequency resources or time resources of the first initial CORESET, and wherein the control channel is transmitted to UEs of the first UE type and a second UE type in the second initial CORESET.

* * * * *